(12) United States Patent
Seo et al.

(10) Patent No.: US 11,662,864 B2
(45) Date of Patent: May 30, 2023

(54) DISPLAY DEVICE

(71) Applicant: Samsung Display Co., LTD., Yongin-si (KR)

(72) Inventors: Jin Seo, Osan-si (KR); Seung Hwa Ha, Hwaseong-si (KR); Se Yoon Oh, Yongin-si (KR); Jong Hwan Lee, Seoul (KR); Min Jae Jeong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 193 days.

(21) Appl. No.: 16/940,984

(22) Filed: Jul. 28, 2020

(65) Prior Publication Data

US 2021/0141417 A1    May 13, 2021

(30) Foreign Application Priority Data

Nov. 8, 2019 (KR) ................. 10-2019-0142424

(51) Int. Cl.
| | | |
|---|---|---|
| *G06F 3/044* | (2006.01) | |
| *G02F 1/1334* | (2006.01) | |
| *G02F 1/13363* | (2006.01) | |
| *G06F 1/16* | (2006.01) | |
| *G02F 1/1333* | (2006.01) | |

(52) U.S. Cl.
CPC .......... *G06F 3/0446* (2019.05); *G02F 1/1334* (2013.01); *G02F 1/13363* (2013.01); *G02F 1/133305* (2013.01); *G06F 1/1616* (2013.01); *G06F 1/1626* (2013.01); *G06F 3/0443* (2019.05); *G02F 1/133342* (2021.01)

(58) Field of Classification Search
CPC ............ G02F 1/133305; G02F 1/1334; G02F 1/13363; G02F 1/133342
USPC ........................................................ 349/106
See application file for complete search history.

(56) References Cited

U.S. PATENT DOCUMENTS

| | | | |
|---|---|---|---|
| 8,758,654 B1* | 6/2014 | Uchikawa | G03F 7/0388 |
| | | | 430/7 |
| 2003/0011728 A1* | 1/2003 | Battersby | G02F 1/13475 |
| | | | 349/106 |
| 2004/0223095 A1* | 11/2004 | Tsubata | G02F 1/133512 |
| | | | 349/106 |
| 2007/0046867 A1* | 3/2007 | Yang | G02F 1/133514 |
| | | | 349/106 |

(Continued)

FOREIGN PATENT DOCUMENTS

| | | |
|---|---|---|
| EP | 3 675 471 | 7/2020 |
| KR | 10-2016-0080467 | 7/2016 |

(Continued)

*Primary Examiner* — Edward J Glick
*Assistant Examiner* — David Y Chung
(74) *Attorney, Agent, or Firm* — Kile Park Reed & Houtteman PLLC

(57) ABSTRACT

A display device includes a first non-folding area and a second non-folding area, a display panel disposed in the first non-folding area and the second non-folding area, a leveling layer on the display panel in the first non-folding area, a protection window on the leveling layer in the first non-folding area, and a transmission control layer on the display panel in the second non-folding area. A thickness of the transmission control layer is substantially equal to a sum of a thickness of the leveling layer and a thickness of the protection window.

19 Claims, 20 Drawing Sheets

(56) References Cited

U.S. PATENT DOCUMENTS

| | | | |
|---|---|---|---|
| 2007/0211195 A1* | 9/2007 | Sohn | G02F 1/133514 349/106 |
| 2015/0185551 A1* | 7/2015 | Kim | G02F 1/13394 349/110 |
| 2016/0091646 A1* | 3/2016 | Yoon | G02F 1/133377 349/86 |
| 2016/0115389 A1* | 4/2016 | Lim | C09K 19/54 349/123 |
| 2016/0260791 A1* | 9/2016 | Fleissner | H01L 27/3216 |
| 2017/0117342 A1* | 4/2017 | Kwon | H01L 27/3276 |
| 2022/0236468 A1* | 7/2022 | Nishio | G02B 5/305 |

FOREIGN PATENT DOCUMENTS

| | | |
|---|---|---|
| KR | 10-1932802 | 3/2019 |
| KR | 10-2019-0044870 | 5/2019 |
| KR | 10-2020-0083768 | 7/2020 |

\* cited by examiner

CHANGE IN TRANSMITTANCE ACCORDING TO RATIO OF LIQUID CRYSTALS

DISPLAY DEVICE

CROSS REFERENCE TO RELATED APPLICATION(S)

This application claims priority to and benefits of Korean Patent Application No. 10-2019-0142424 under 35 U.S.C. § 119 filed on Nov. 8, 2019 in the Korean Intellectual Property Office, the entire contents of which are incorporated herein by reference.

BACKGROUND

1. Technical Field

The disclosure relates to a display device.

2. Description of the Related Art

An electronic device such as a smartphone and a tablet PC may have a transparent display. The transparent display allows a user to see a side (for example, the rear side) from another side (for example, the front side) of the transparent display. In other words, on the transparent display, an object located or disposed on the rear side is projected onto the front side.

In addition, an electronic device may have a foldable display device in which the screen may be folded into several parts. A foldable display device may be, for example, a flexible display device. Foldable display devices may be implemented by providing flexibility to display devices by replacing a glass substrate surrounding liquid crystals of the organic light-emitting diode (OLED) with a plastic film.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a display device that may adjust a transmittance on the entire display surface or a part of the display surface.

Aspects of the disclosure also provide a display device allowing a user to see images displayed on the display surface from the outside in a case that the display device is folded inward.

It should be noted that objects of the disclosure are not limited to the above-mentioned object; and other objects of the disclosure will be apparent to those skilled in the art from the following descriptions.

An embodiment of a display device may include a first non-folding area and a second non-folding area, a display panel disposed in the first non-folding area and the second non-folding area, a leveling layer disposed on the display panel in the first non-folding area, a protection window disposed on the leveling layer in the first non-folding area, and a transmission control layer disposed on the display panel in the second non-folding area, wherein a thickness of the transmission control layer may be substantially equal to a sum of a thickness of the leveling layer and a thickness of the protection window.

The transmission control layer may include a polymer-dispersed liquid crystal layer.

A refractive index anisotropy of the polymer-dispersed liquid crystal layer may be in a range of about 0.1 to about 0.25.

The transmittance of the control layer may have a transmittance in a range of about 5% to about 95%.

The display device may further include a protective film disposed on the transmission control layer and the protection window and extending from the first non-folding area to the second non-folding area.

The display panel in the second non-folding area may comprise a display-transmission area comprising a plurality of pixels and at least one transmissive area.

The display panel in the second non-folding area may comprise a display-only area comprising a plurality of pixels and no transmissive area.

The display-transmission area may be a both-sided emission display panel.

The display device may further include a lower leveling layer disposed below the display-only area; and a lower transmission control layer disposed below the display-transmission area.

A thickness of the lower transmission control layer may be substantially equal to a thickness of the lower leveling layer.

The thickness of the transmission control layer may be in a range of about 0.3 to about 0.5 μm or in a range of about 0.1 to about 0.7 μm.

The transmission control layer may include liquid crystal molecules, and a refractive index anisotropy of the liquid crystal molecules may be in a range of about 0.10 to about 0.25.

An embodiment of a display device may include a first non-folding area, a second non-folding area, and a folding line disposed between the first non-folding area and the second non-folding area, a display panel including a display-only area disposed in the first non-folding area, and a display-transmission area disposed in the second non-folding area, and a transmission control layer disposed in the second non-folding area, wherein the display panel may include pixels and transmissive areas, the transmissive areas may have a transmittance higher than a transmittance of the pixels, and the transmissive areas may be disposed in the display-transmission area.

The display device may further include an active area that may include a first display area overlapping the first non-folding area; and a second display area overlapping the second non-folding area, wherein a resolution of the first display area may be greater than a resolution of the second display area.

The pixels and the transmissive areas may be arranged alternately in the display-transmission area, and an area of the pixels may be substantially equal to an area of the transmissive areas.

The display device may further include a protection window and a leveling layer disposed in the first non-folding area, wherein a sum of a thickness of the protection window and a thickness of the leveling layer may be substantially equal to a thickness of the transmission control layer.

A thickness of the transmission control layer may be in a range of about 0.3 to about 0.5 μm or in a range of about 0.1 to about 0.7 μm.

The transmission control layer may include liquid crystal molecules, and a refractive index anisotropy of the liquid crystal molecules may be in a range of about 0.10 to about 0.25.

The display-transmission area may be a both-sided emission display panel.

The display device may further include a lower leveling layer disposed below the display-only area; and a lower transmission control layer disposed below the display-transmission area, wherein a thickness of the lower transmission control layer may be substantially equal to a thickness of the lower leveling layer.

According to an embodiment, a display device may adjust the transmittance on the entire display surface or a part of the display surface.

A display device may allow a user to see images displayed on the display surface from the outside in a case that the display device may be folded inward.

It should be noted that effects are not limited to those described above and other effects will be apparent to those skilled in the art from the following descriptions.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
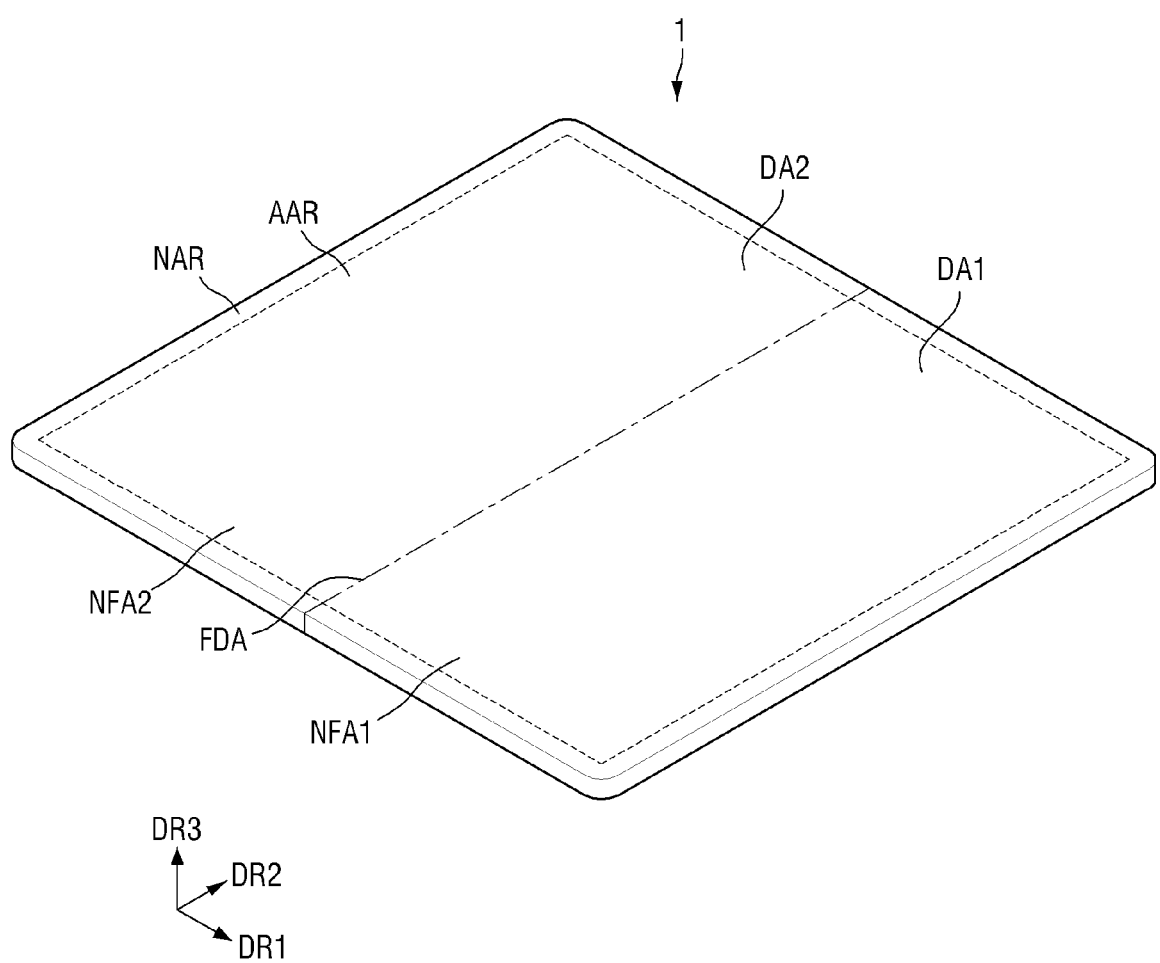
FIG. 1 is a perspective view of a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

Some of the parts which are not associated with the description may not be provided in order to describe embodiments of the disclosure and like reference numerals refer to like elements throughout the specification.

As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

The same reference numbers indicate the same components throughout the specification. In the attached figures, the thickness of layers and regions may be exaggerated for clarity.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

As used herein, the singular forms "a," "an," and "the" are intended to include the plural forms as well, unless the context clearly indicates otherwise.

It will be further understood that when the terms "comprises," "comprising," "includes" and/or "including", "have" and/or "having" are used in this specification, they or it may specify the presence of stated features, integers, steps, operations, elements and/or components, but do not preclude the presence or addition of other features, integers, steps, operations, elements, components, and/or any combination thereof.

When a layer, film, region, substrate, or area, or element is referred to as being "on" another layer, film, region, substrate, or area, or element, it may be directly on the other film, region, substrate, or area, or element, or intervening films, regions, substrates, or areas, or elements may be present therebetween. Conversely, when a layer, film, region, substrate, or area, or element, is referred to as being "directly on" another layer, film, region, substrate, or area, or element, intervening layers, films, regions, substrates, or areas, may be absent therebetween. Further when a layer, film, region, substrate, or area, or element, is referred to as being "below" another layer, film, region, substrate, or area, or element, it may be directly below the other layer, film, region, substrate, or area, or element, or intervening layers, films, regions, substrates, or areas, or elements, may be present therebetween. Conversely, when a layer, film, region, substrate, or area, or element, is referred to as being "directly below" another layer, film, region, substrate, or area, or element, intervening layers, films, regions, substrates, or areas, or elements may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

In the drawings, sizes and thicknesses of elements may be enlarged for better understanding, clarity, and ease of description thereof. However, the disclosure is not limited to the illustrated sizes and thicknesses. In the drawings, the thicknesses of layers, films, panels, regions, and other elements, may be exaggerated for clarity. In the drawings, for better understanding and ease of description, the thicknesses of some layers and areas may be exaggerated.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

Further, in the specification, the phrase "in a plan view" means when an object portion is viewed from above, and the phrase "in a schematic cross-sectional view" means when a schematic cross-section taken by vertically cutting an object portion is viewed from the side.

It will be understood that when a layer, region, or component is referred to as being "connected" or "coupled" to another layer, region, or component, it may be "directly connected" or "directly coupled" to the other layer, region, or component and/or may be "indirectly connected" or "indirectly coupled" to the other layer, region, or component with other layers, regions, or components interposed therebetween. For example, it will be understood that when a layer, region, or component is referred to as being "electrically connected" or "electrically coupled" to another layer, region, or component, it may be "directly electrically connected" or "directly electrically coupled" to the other layer, region, or component and may be "indirectly electrically connected" or "indirectly electrically coupled" to the other layer, region, or component with other layers, regions, or components interposed therebetween.

Also, when an element is referred to as being "in contact" or "contacted" or the like to another element, the element may be in "electrical contact" or in "physical contact" with another element; or in "indirect contact" or in "direct contact" with another element.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that may not be perpendicular to one another.

Unless otherwise defined, all terms (including technical and scientific terms) used herein have the same meaning as commonly understood by one of ordinary skill in the art to which embodiments pertain. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

In concluding the detailed description, those skilled in the art will appreciate that many variations and modifications may be made to the embodiments without departing from the principles of the disclosure. Therefore, the disclosed embodiments are used in a generic and descriptive sense only and not for purposes of limitation.

Hereinafter, embodiments will be described with reference to the accompanying drawings.

Figure 2:
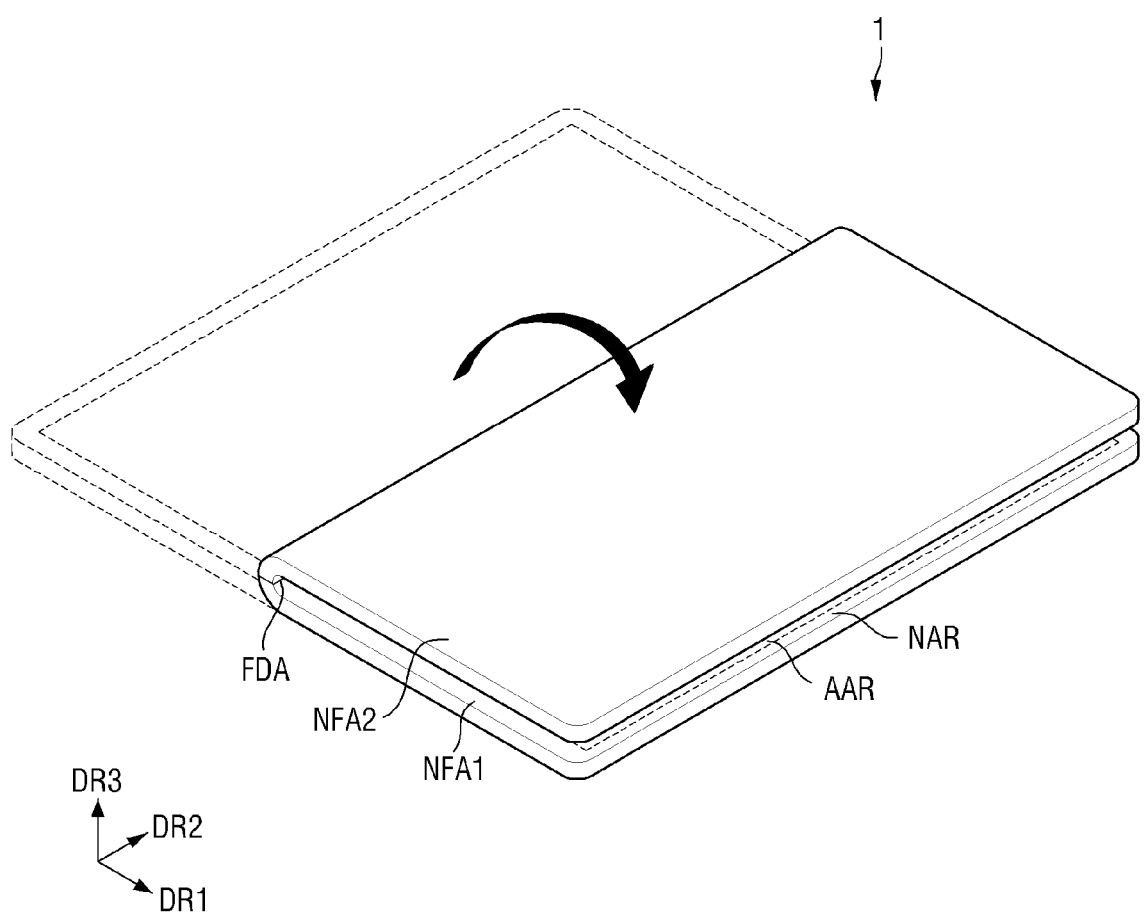
FIG. 2 is a perspective view showing the display device of FIG. 1 in a case that the display device is folded inward.

FIG. 1 is a perspective view of a display device according to an embodiment. FIG. 2 is a perspective view showing the display device of FIG. 1 in a case that the display device is folded inward.

In the drawings, the first direction DR1 denotes the horizontal direction of a display device 1 and the second direction DR2 denotes the vertical direction of the display device 1 when viewed from the top. The third direction denotes the thickness direction of the display device 1. The first direction DR1 is perpendicular to the second direction DR2. The thickness direction (third direction) is orthogonal to the plane in which the first direction DR1 and the second direction DR2 lie and is perpendicular to the first and second directions DR1 as well as the second direction DR2. It should be understood, however, that the directions referred to with respect to the embodiments are relative directions, and the embodiments are not limited to the directions mentioned.

The display device 1 may display images in an active area AAR to be described and may include a variety of devices including the active area AAR. Examples of the display device 1 include, but are not limited to, a smart phone, a mobile phone, a tablet PC, a personal digital assistant (PDA), a portable multimedia player (PMP), a television set, a game machine, a wristwatch-type electronic device, a head-mounted display, a personal computer monitor, a laptop computer, a vehicle navigation system, a vehicle instrument cluster, a digital camera, a camcorder, an outdoor billboard or other billboard, an electronic billboard, various medical apparatuses, various inspection devices, various home appliances including an active area AAR such as a refrigerator and a laundry machine, Internet of things (IoT) devices, for example, within the spirit and the scope of the disclosure.

The display device 1 may have a substantially rectangular shape or a substantially square shape when viewed from the top. The display device 1 may be a rectangle having corners at the right angle or rounded corners when viewed from the top. The display device 1 may include two shorter sides extended in the horizontal direction (the first direction DR1), and two longer sides extended in the vertical direction (the second direction DR2).

The display device 1 may include an active area AAR and a non-active area NAR. The active area AAR of the display device 1 may include a display area. In a case that the display device 1 has touch features, a touch area where a touch input or touch event may be sensed may also be included in the active area AAR.

The shape of the active area AAR may substantially conform to the shape of the display device 1 including the active area AAR. For example, when the shape of the display device 1 is a rectangle when viewed from the top, the shape of the active area AAR may also be a rectangle.

The active area AAR may include pixels. Each of the pixels may be a unit that may display an image. The pixels may include, but are not limited to, a red pixel, a green pixel and a blue pixel. Pixels may be arranged or disposed sequentially and repeatedly when viewed from the top. For example, the pixels may be arranged or disposed in, but are not limited to, a matrix.

Figure 5:
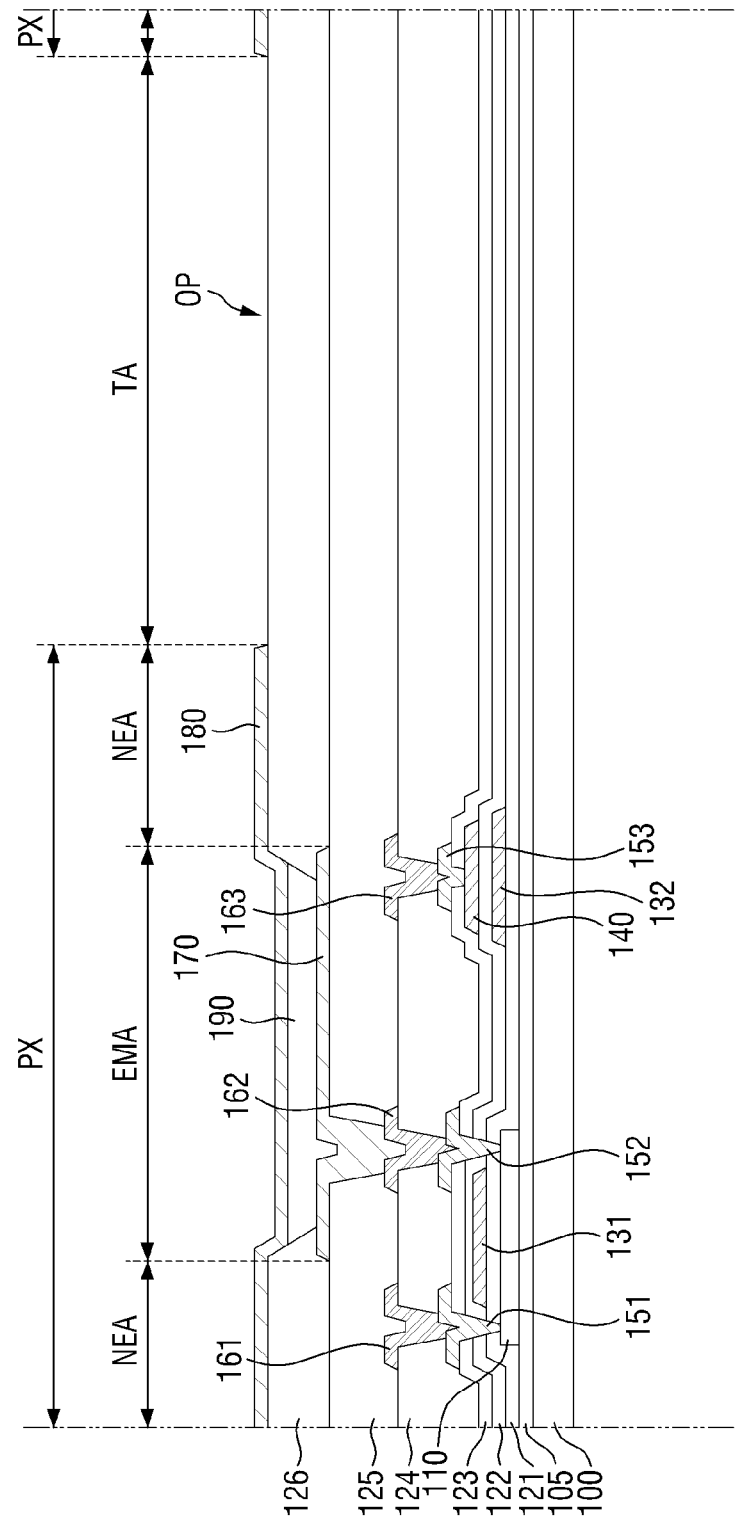
FIG. 5 is a schematic cross-sectional view of a pixel and a transmissive area of a display panel according to an embodiment.

Each of the pixels may include an emission area EMA (see FIG. 5). The emission area EMA may be defined as the area in which a light-emitting material, for example, an organic light-emitting layer may be disposed. The size of the organic emission layer may be smaller than the size of the pixel. The area of the pixel in which a light-emitting material such as an organic light-emitting layer may not be disposed may be defined as a non-emission area NEA (see FIG. 5). Circuits or lines that may drive the pixel may be disposed in the non-emission area NEA. It is, however, to be understood that the disclosure is not limited thereto.

The non-active area NAR may surround or be adjacent to the active area AAR. The non-active area NAR may include a non-display area where no image may be displayed. The non-active area NAR may surround or be adjacent to all sides of the active area AAR, but the disclosure is not limited thereto. The non-active area NAR may not be disposed near at least some of the four sides of the active area AAR. The bezel area of the display device 1 may be formed as the non-active area NAR.

The active area AAR may be divided into a first display area DA1 and a second display area DA2 depending on whether transmissive areas TA are included or not included. According to an embodiment, the first display area DA1 may correspond to a first non-folding area NFA1 of the active area AAR, and the second display area DA2 may correspond to a second non-folding area NFA2. It is, however, to be understood that the disclosure is not limited thereto. The first display area DA1 may overlap a display-only area 11 (see FIG. 3) in the thickness direction (third direction DR3), and the second display area DA2 may overlap a display-transmission area 12 (see FIG. 3) in the thickness direction (third direction DR3).

Figure 6:
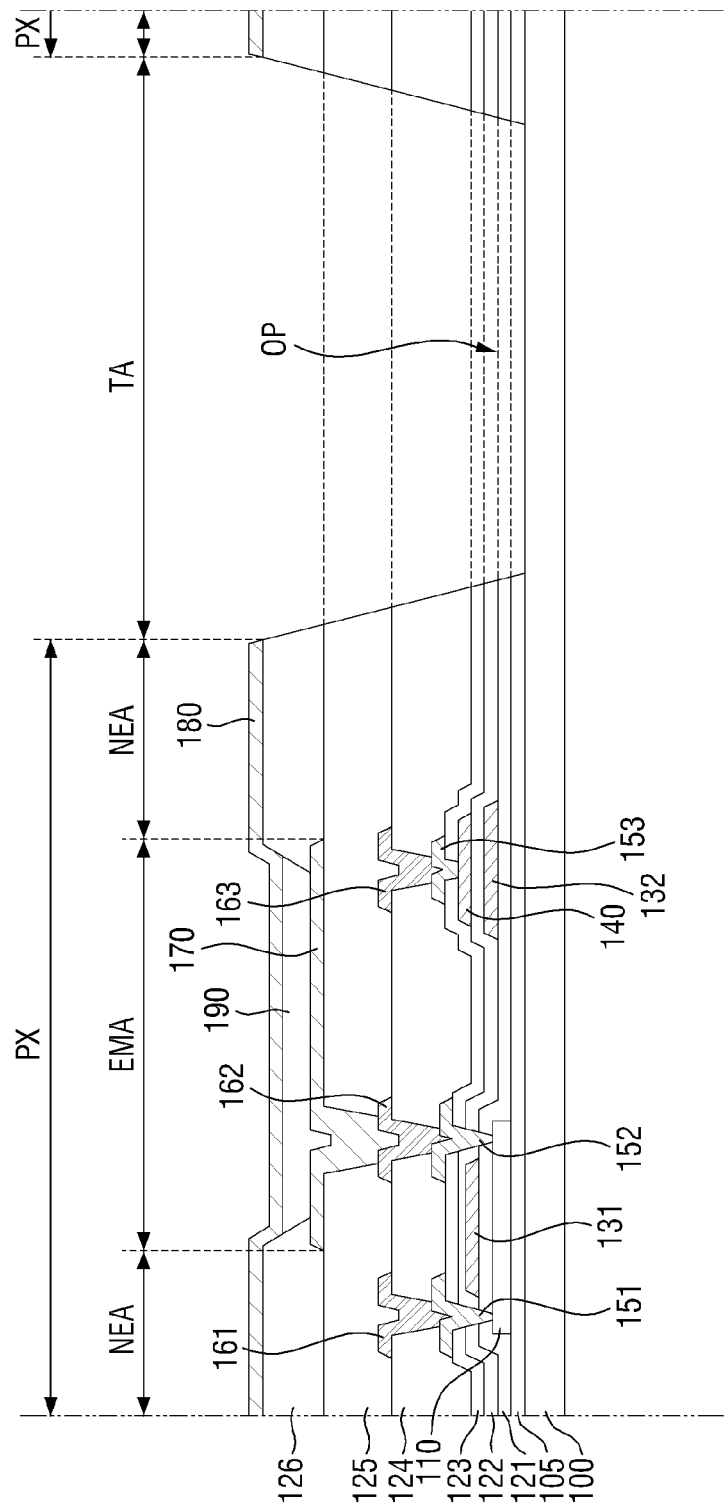
FIG. 6 is a schematic cross-sectional view of a pixel and a transmissive area of a display panel according to an embodiment.
Figure 7:
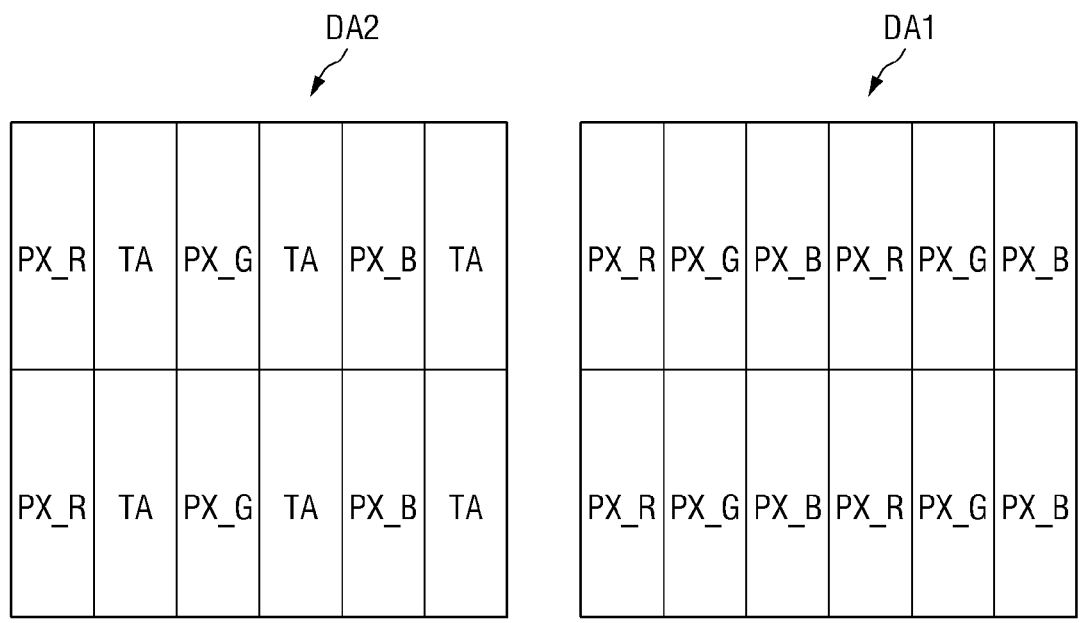
FIG. 7 is a view showing an arrangement of pixels and transmissive areas at different display areas of a display panel according to an embodiment.
Figure 7:
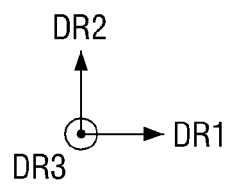

The first display area DA1 may not transmit light but may display images and thus include no transmissive area TA (see FIGS. 5 to 7). The second display area DA2 may transmit light and may also display images and thus may include transmissive areas TA separated from one another (see FIGS. 5 to 7).

The transmissive areas TA (see FIGS. 5 to 7) may not emit light by itself but transmit light in the thickness direction. The light may include not only light in the visible wavelength but also light in the near infrared and/or infrared wavelength. The light transmitted through the transmissive areas TA (see FIGS. 5 to 7) may include light in the near ultraviolet and/or the ultraviolet wavelength.

The non-emission area NEA (see FIG. 5) of each of the pixels may also not emit light by itself, but the transmissive areas TA (see FIGS. 5 to 7) may have a higher transmittance than the non-emission area. Herein, the transmittance refers to the transmittance of light passing through an area in the thickness direction. Therefore, the second display area DA2 including the transmissive areas (see FIGS. 5 to 7) may have a higher transmittance than the first display area DA1 including no transmissive area (see FIGS. 5 to 7). The second display area DA2 may be applicable to a variety of applications. As a non-limiting example, the second display area DA2 may be used as a transparent display. In such case, no other elements may be disposed on the rear side of the second display area DA2, and a user may see an object located or disposed on the rear side through the second display area DA2 like a window.

The display device 1 may be a foldable display device. As used herein, a foldable display device refers to a display device that may be folded or bent or rolled and may have both a folded state and an unfolded state, a bent or an unbent state, or a rolled or an unrolled state. In a case that a device is folded, the device may typically be folded at an angle of approximately 180°. It is, however, to be understood that the disclosure is not limited thereto. For example, in a case that a device is folded at an angle greater than or less than about 180°, for example, at an angle of about 90° or more but less than about 180° or an angle of about 120° or more and less than about 180°, the device may also be referred to as being folded. Even in a case that a device is not completely folded, the device may be referred to as being folded if the device is bent and is not unfolded. For example, even if a device is bent at an angle of about 90 degrees or less, the device may be referred to as being folded in order to distinguish it from being unfolded as long as the maximum folding angle is about 90 degrees or more.

The display device 1 may include a folding line FDA (or a folding area). The display device 1 may be folded along the folding line FDA. The folding may be divided into in-folding in which the display surface of the display device 1 may be folded inward, and out-folding in which the display surface of the display device 1 may be folded outward. Although the display device 1 shown in FIG. 2 is an in-folding display device, the disclosure is not limited thereto. The display device 1 may be an out-folding display device. The display device 1 may have either in-folding design or an out-folding design, or may have in-and-out-folding design. For a display device having the in-and-out-folding design, the device may be folded inward and outward along the same folding line FDA or may be folded inward and outwardly along different lines, respectively.

The folding line FDA may be extended in parallel to a side of the display device 1. For example, the folding line FDA may be extended in the same direction as the vertical direction of the display device 1 (the second direction DR2 in FIG. 1). The folding line FDA may have a predetermined width in the first direction DR1 as well. In such case, the width of the folding line FDA in the first direction DR1 may be much smaller than the width in the second direction DR2.

The display device 1 may include non-folding areas NFA disposed near the folding line FDA. The non-folding areas NFA may include a first non-folding area NFA1 located or disposed on a side of the folding line FDA in the first direction DR1 and a second non-folding area NFA2 located or disposed on another side of the folding line FDA in the first direction DR1. The width of the first non-folding area NFA1 in the first direction DR1 may be, but is not limited to being, substantially equal to that of the second non-folding area NFA2.

According to an embodiment, the display device 1 may be folded as the display panel 10 or the layers. A panel and a substrate stacked thereon may have flexibility so that they all may be folded. According to an embodiment, the display panel 10 or at least some of the elements stacked thereon may be separated at the folding line FDA. In such case, the separated elements located or disposed in the non-folding areas NFA may not be flexible.

The active area AAR, non-active area NAR and the folding line FDA, non-folding areas NFA of the display device 1 may overlap at the same position. For example, a certain or predetermined location may be the active area AAR and the first non-folding area NFA1 Another location may be the non-active area NAR and the first non-folding area NFA1 Another location may be the active area AAR and the folding line FDA. However, the disclosure is not limited thereto.

According to an embodiment, the active area AAR of the display device 1 may be disposed over both the first non-folding area NFA1 and the second non-folding area NFA2. Moreover, the active area AAR may also be located or disposed at the folding line FDA that may be the boundary between the first non-folding area NFA1 and the second non-folding area NFA2. For example, the active area AAR of the display device 1 may be continuously disposed irrespective of the boundary between the non-folding area NFA and the folding line FDA, for example. It is, however, to be understood that the disclosure is not limited thereto. The active area AAR may be located or disposed in only one of the first non-folding area NFA1 and the second non-folding area NFA2, or the active area AAR may be disposed in the first non-folding area NFA1 and the second non-folding area NFA2 but not in the folding line FDA.

Hereinafter, the schematic cross-sectional structure of the display device 1 described above will be described.

Figure 3:
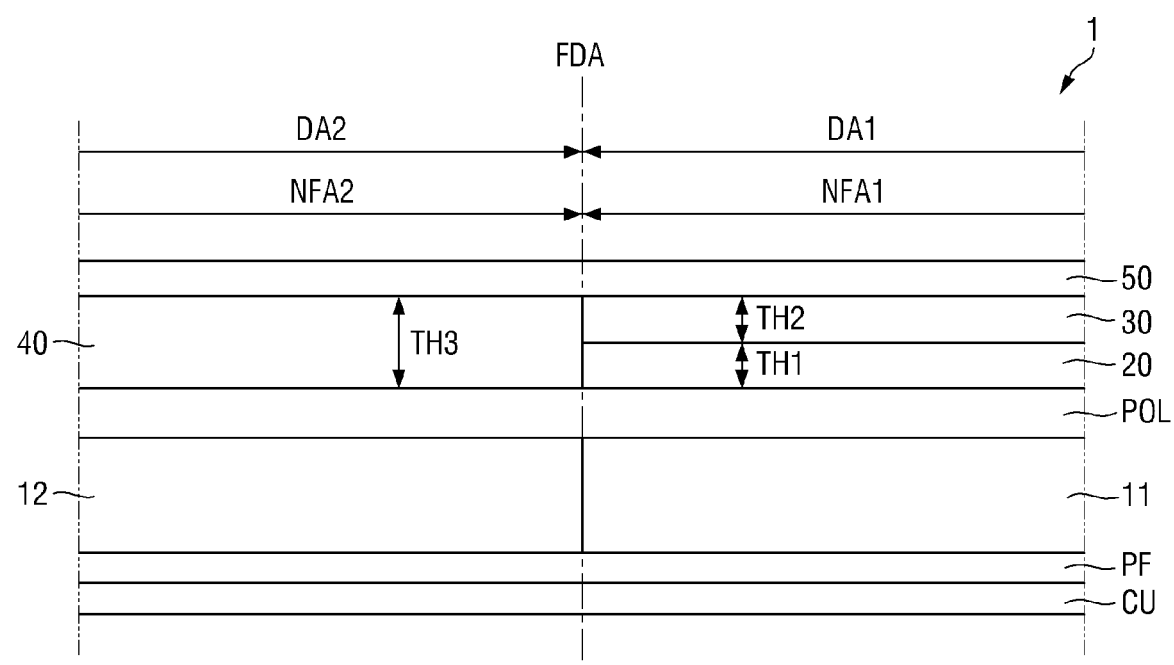
FIG. 3 is a schematic cross-sectional view of a display device according to an embodiment in a case that the display device is unfolded.
Figure 4:
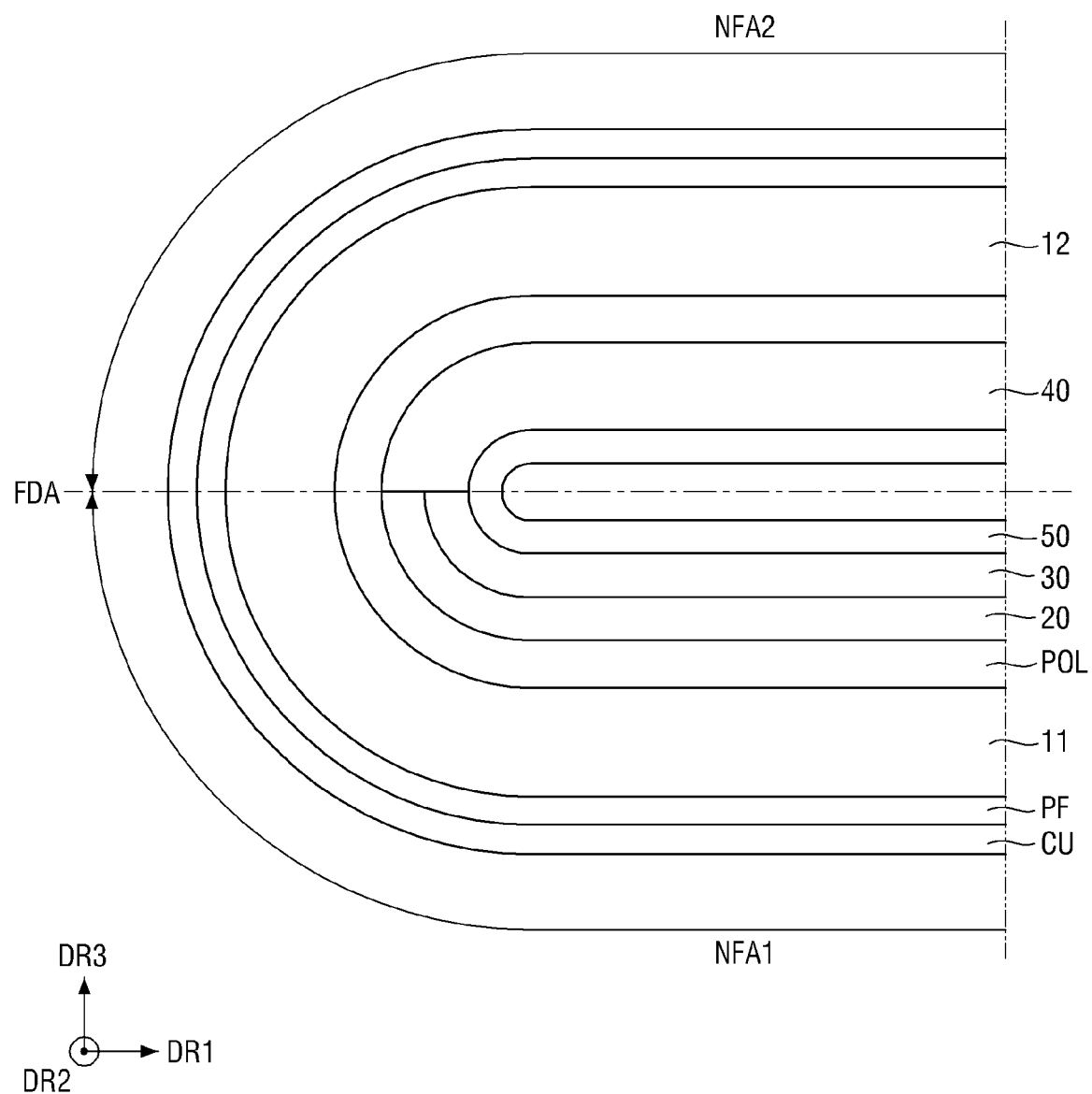
FIG. 4 is a schematic cross-sectional view of the display device in a case that the display device is folded inward.

FIG. 3 is a schematic cross-sectional view of a display device according to an embodiment in a case that the display device is unfolded. FIG. 4 is a schematic cross-sectional view of the display device in a case that the display device is folded inward.

Referring to FIGS. 3 and 4, the display device 1 may include a display panel 10, a polarizer POL stacked on a side of the display panel 10 in the thickness direction (the third direction DR3), a leveling layer 20 and a protection window 30 disposed in the first non-folding area NFA1, a transmission control layer 40 disposed in the second non-folding area NFA2, and a protective film 50, and may include a polymer film layer PF and a cushion layer CU sequentially stacked on another side of the display panel 10 in the thickness direction (third direction DR3). At least one coupling member, such as an adhesive layer, may be disposed between the elements stacked on one another to couple them. It is, however, to be understood that the disclosure is not limited thereto. Another layer may be disposed between the layers, and some of the elements stacked on one another may be eliminated.

The display panel 10 may display images and may include a self-luminous display panel such as an organic light-emitting display panel (OLED), an inorganic light-emitting display panel (inorganic EL), a quantum-dot light-emitting display panel (QED), a micro LED display panel (micro-LED), a nano LED display panel (nano-LED), a plasma display panel (PDP), a field emission display panel (FED) and a cathode ray display panel (CRT), as well as a light-receiving display panel such as a liquid-crystal display panel (LCD) and an electrophoretic display panel (EPD). In the following description, the organic light-emitting display panel will be described as an example of the display panel 10, and the organic light-emitting display panel will be simply referred to as the display panel 10 unless specifically stated otherwise. It is, however, to be understood that the embodiments are not limited to the organic light-emitting display panel, and any other display panels listed above or within the spirit and the scope of the disclosure may be employed without departing from the scope of the disclosure.

The display panel 10 may include the display-only area 11 disposed in the first non-folding area NFA1 and the display-transmission area 12 disposed in the second non-folding area NFA2. The display-only area 11 may include only the pixels PX, while the display-transmission area 12 may include the pixels PX as well as the transmissive areas TA (see FIGS. 5 to 7). The display-only area 11 and the display-transmission area 12 may be formed separately and may be spaced apart from each other in the vicinity of the folding line FDA. It is, however, to be understood that the disclosure is not limited thereto. For example, the display-only area 11 and the display-transmission area 12 may be formed as a single element.

Hereinafter, the structure of the display panel 10 will be described in detail with reference to FIGS. 5 to 7.

FIG. 5 is a schematic cross-sectional view of a pixel and a transmissive area of a display panel according to an embodiment.

Initially, the schematic cross-sectional structure of a pixel PX will be described in detail with respect to FIG. 5. The display panel 10 may include a substrate 100, a buffer layer 105, a semiconductor layer 110, a first insulating layer 121, a first conductive layer 130 (illustrated as 131), a second insulating layer 122, a second conductive layer 140, a third insulating layer 123, a third conductive layer 150, a fourth insulating layer 124, a fourth conductive layer 160, a fifth insulating layer 125, a fifth conductive layer 170, a bank 126 including an opening for exposing the fifth conductive layer 170, an organic layer 190 disposed within the opening of the bank 126, and a sixth conductive layer 180 disposed on the organic layer 190 and the bank 126. Each of the layers described above may be made up of a single layer, or a stack of layers including a plurality of layers. Although not illustrated, other layers may be disposed between the layers. As described below, the first conductive layer 130 may include a gate electrode 131 of the thin-film transistor of the pixel PX.

The substrate 100 supports the layers disposed thereon. The substrate 100 may be made of an insulating material such as a polymer resin. Examples of the polymer material may include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP) or a combination thereof. The substrate 100 may be a flexible substrate that may be bent, folded, or rolled. An example of the material of the flexible substrate may be, but is not limited to, polyimide (PI).

The buffer layer 105 may be disposed on the substrate 100. The buffer layer 105 may prevent impurity ions from diffusing, may prevent permeation of moisture or outside air, and may provide a flat surface. The buffer layer 105 may include silicon nitride, silicon oxide, silicon oxynitride, or the like within the spirit and the scope of the disclosure. The buffer layer 105 may be eliminated depending on the type of the substrate 100, process conditions, or other factors within the spirit and the scope of the disclosure.

The semiconductor layer 110 may be disposed on the substrate 100. The semiconductor layer 110 may form a channel of a thin-film transistor of the pixel PX. The semiconductor layer 110 may include polycrystalline silicon. It is, however, to be understood that the disclosure is not limited thereto. The semiconductor layer 110 may include monocrystalline silicon, low-temperature polycrystalline silicon, amorphous silicon, or an oxide semiconductor. The oxide semiconductor may include, for example, a binary compound (ABx), a ternary compound (ABxCy) and a quaternary compound (ABxCyDz) containing indium (In), zinc (Zn), gallium (Ga), tin (Sn), titanium (Ti), aluminum (Al), hafnium (Hf), zirconium (Zr), magnesium (Mg), or other elements.

The first insulating layer 121 may be a gate insulating layer having a gate insulating function. The first insulating layer 121 may include a silicon compound, a metal oxide, within the spirit and the scope of the disclosure. For example, the first insulating layer 121 may include silicon oxide, silicon nitride, silicon oxynitride, aluminum oxide, tantalum oxide, hafnium oxide, zirconium oxide, titanium oxide, within the spirit and the scope of the disclosure. These materials may be used alone or in combinations. The first insulating layer 121 may be made up of a single layer or multiple layers of different materials stacked on one another.

The first insulating layer 121 may be disposed on the semiconductor layer 110 and may be disposed over the entire surface of the substrate 100.

The first conductive layer 130 (or, gate electrode 131) may be disposed on the first insulating layer 121. The first conductive layer 130 may be a first gate conductive layer. The first conductive layer 130 may include a gate electrode 131 of the thin-film transistor of the pixel PX and a scan line electrically connected thereto, and may include a first electrode 132 of a storage capacitor.

The first conductive layer 130 may include at least one metal selected from the group consisting of: molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W) and copper (Cu). The first conductive layer 130 may be made up of a single layer or multiple layers.

A second insulating layer 122 may be disposed on the first conductive layer 130 (or the gate electrode 131). The second insulating layer 122 may be an interlayer dielectric layer. The second insulating layer 122 may include an inorganic insulating material such as silicon oxide, silicon nitride, silicon oxynitride, hafnium oxide, aluminum oxide, titanium oxide, tantalum oxide and zinc oxide.

The second conductive layer 140 may be disposed on the second insulating layer 122. The second conductive layer 140 may be a second gate conductive layer. The second conductive layer 140 may include a second electrode 140 of the storage capacitor. The second conductive layer 140 may include at least one metal selected from the group consisting of: molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W) and copper (Cu). The second conductive layer 140 may be made of, but is not limited to, the same or similar material as the first conductive layer 130. The second conductive layer 140 may be made up of a single layer or multiple layers.

A third insulating layer 123 may be disposed on the second conductive layer 140. The third insulating layer 123 may be an interlayer dielectric layer. The third insulating layer 123 may include an inorganic insulating material such as silicon oxide, silicon nitride, silicon oxynitride, hafnium oxide, aluminum oxide, titanium oxide, tantalum oxide and zinc oxide, or an organic insulating material such as polyacrylates resin, epoxy resin, phenolic resin, polyamides resin, polyimides resin, unsaturated polyesters resin, poly phenylenethers resin, polyphenylenesulfides resin and benzocyclobutene (BCB). The third insulating layer 123 may be made up of a single layer or multiple layers of different materials stacked on one another.

The third conductive layer 150 (illustrated at 151) may be disposed on the third insulating layer 123. The third conductive layer 150 may be a first source/drain conductive layer. The third conductive layer 150 may include a first electrode 151 and a second electrode 152 of the thin film transistor of the pixel PX. The first electrode 151 and the second electrode 152 of the thin film transistor may be electrically connected to the source region and the drain region of the semiconductor layer 110, respectively, through contact holes passing through the third insulating layer 123, the second insulating layer 122 and the first insulating layer 121. A first supply voltage electrode 153 of the pixel PX may be formed as the third conductive layer 150.

The third conductive layer 150 may include at least one metal selected from the group consisting of: aluminum (Al), molybdenum (Mo), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W) and copper (Cu). The third conductive layer 150 may be made up of a single layer or multiple layers. For example, the third conductive layer 150 may have a stack structure of Ti/Al/Ti, Mo/Al/Mo, Mo/AlGe/Mo, and Ti/Cu.

The fourth insulating layer 124 may be disposed on the third conductive layer 150. The fourth insulating layer 124 may cover or overlap the third conductive layer 150. The fourth insulation layer 124 may be a via layer. The fourth insulating layer 124 may include an organic insulating material such as polyacrylate resin, epoxy resin, phenolic resin, polyamide resin, polyimide resin, unsaturated polyesters resin, poly phenylen ether resin, poly phenylene sulfide resin, and benzocyclobutene (BCB).

The fourth conductive layer 160 may be disposed on the fourth insulating layer 124. The fourth conductive layer 160 may be a second source/drain conductive layer. The fourth conductive layer 160 may include a data line, a connection electrode 162, and first supply voltage lines 161 and 163 of the pixel PX. The first supply voltage line 161 may be electrically connected to the first electrode 151 of the thin-film transistor through a contact hole passing through the fourth insulating layer 124. The connection electrode 162 may be electrically connected to the second electrode 152 of the thin-film transistor of the pixel PX through the contact hole passing through the fourth insulating layer 124. The first supply voltage line 163 may be electrically connected to the first supply voltage electrode 153 through a contact hole passing through the fourth insulating layer 124.

The fourth conductive layer 160 may include at least one metal selected from the group consisting of: aluminum (Al), molybdenum (Mo), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W) and copper (Cu). The fourth conductive layer 160 may be made up of a single layer or multiple layers. The fourth conductive layer 160 may be made of, but is not limited to, the same or similar material as the third conductive layer 150.

The fifth insulating layer 125 may be disposed on the fourth conductive layer 160. The fifth insulating layer 125 may cover or overlap the fourth conductive layer 160. The fifth insulation layer 125 may be a via layer. The fifth insulating layer 125 may include the same or similar material as the fourth insulating layer 124 or may include one or more materials selected from the materials listed above as the materials of the fourth insulating layer 124.

The fifth conductive layer 170 may be disposed on the fifth insulating layer 125. The anode electrode, which may be the pixel electrode, may be formed as the fifth conductive layer 170. The anode electrode may be electrically connected to the connection electrode 162 formed of the fourth conductive layer 160 through the contact hole formed in the fifth insulating layer 125 and may be electrically connected to the second electrode 152 of the thin-film transistor therethrough. The anode electrode may at least partially overlap the emission area EMA of the pixel PX.

The fifth conductive layer 170 may have a stack structure of a material layer having a high work function such as indium-tin-oxide (ITO), indium-zinc-oxide (IZO), zinc oxide (ZnO) and indium oxide ($In_2O_3$), and a reflective material layer such as silver (Ag), magnesium (Mg), aluminum (Al), platinum (Pt), lead (Pd), gold (Au), nickel (Ni), neodymium (Nd), iridium (Ir), chromium (Cr), lithium (Li), calcium (Ca) or a mixture thereof. The layer having a high work function may be disposed above the reflective material layer so that it may be disposed closer to the organic layer 190. The fifth conductive layer 170 may have, but is not limited to, a multilayer structure of ITO/Mg, ITO/MgF, ITO/Ag, and ITO/Ag/ITO.

The pixel defining layer 126 may be disposed on the fifth conductive layer 170. The bank 126 may at least partially overlap the non-emission area NEA of the pixel PX. The bank 126 may include an opening exposing the fifth conductive layer 170. The pixel defining layer 126 may include an inorganic insulating material such as silicon oxide, silicon nitride, silicon oxynitride, hafnium oxide, aluminum oxide, titanium oxide, tantalum oxide and zinc oxide, or an organic insulating material such as polyacrylates resin, epoxy resin, phenolic resin, polyamides resin, polyimides resin, unsaturated polyesters resin, poly phenylenethers resin, polyphenylenesulfides resin and benzocyclobutene (BCB). The pixel defining layer 126 may be made up of a single layer or multiple layers of different materials stacked on one another.

An organic layer 190 may be disposed in the opening of the pixel defining layer 126. The organic layer 190 may include an organic emissive layer, a hole injecting/transporting layer, and an electron injecting/transporting layer. The organic layer 190 may overlap the emission area EMA.

A sixth conductive layer 180 may be disposed on the organic layer 190 and the bank 126. The cathode electrode, which may be the common electrode, may be formed as the sixth conductive layer 180. The anode electrode may also be disposed in the non-emission area NEA as well as the emission area EMA of the pixel PX. In other words, the cathode electrode may be disposed on the entire surface of each of the pixels PX. The sixth conductive layer 180 may include a material having a small work function such as Li, Ca, LiF/Ca, LiF/Al, Al, Mg, Ag, Pt, Pd, Ni, Au, Nd, Ir, Cr, BaF, Ba, or a compound or mixture thereof. The sixth conductive layer 180 may include a transparent metal oxide layer disposed on the material layer having a small work function.

Although not shown in the drawings, an encapsulation layer may be disposed on the sixth conductive layer 180. The encapsulation layer may include an inorganic layer. According to an embodiment, the encapsulation layer may include a first inorganic layer, an organic layer on the first inorganic layer, and a second inorganic layer on the organic layer.

Subsequently, the schematic cross-sectional structure of the transmissive area TA will be described. The transmissive area TA has a structure in which some of the layers of the stack structure of the pixel PX may be removed. Since the transmissive area TA may not emit light, the layers such as the anode electrode, the organic emission layer and the cathode electrode may be eliminated. As such layers are eliminated, the transmissive area TA may have a higher transmittance than the pixel PX.

The sixth conductive layer 180, which may be the cathode electrode, may not be disposed in the transmissive area TA. The cathode electrode may be the common electrode, and the sixth conductive layer 180 may be disposed over the entire area of the pixel PX, but it may be eliminated in the transmissive area TA to form an opening OP. The opening OP may be defined by the sixth conductive layer 180. In a top-emission panel, the cathode electrode may transmit some light, but may reflect or absorb a substantial amount of light. Since the sixth conductive layer 180, which may be the cathode electrode, may not be disposed in the transmissive area TA, the transmissive area may have a higher transmittance than that of the non-emission area NEA of the pixel PX.

The fifth conductive layer 170, which may be the anode electrode, may not be disposed in the transmissive area TA. In a top-emission panel, the anode electrode may include the reflective material layer as described above. In the light transmissive area TA, the fifth conductive layer 170 may not be disposed to allow light to transmit in the thickness direction. Since the organic layer 190 may not be disposed in the transmissive area TA, the transmissive area TA may have a higher transmittance. Moreover, neither the semiconductor layer nor other conductive layers may be disposed in the transmissive area TA.

Therefore, the stack structure of the transmissive area TA may include, for example, the substrate 100, the buffer layer 105, the first insulating layer 121, the second insulating layer 122, the third insulating layer 123, the fourth insulating layer 124, the fifth insulating layer 125, and the bank 126, as shown in FIG. 6.

FIG. 6 is a schematic cross-sectional view of a pixel and a transmissive area of a display panel according to an embodiment. FIG. 6 illustrates that the insulating layers may be eliminated from the structure of the transmissive area TA of FIG. 5.

Referring to FIG. 6, the bank 126, the fifth insulating layer 125, the fourth insulating layer 124, the third insulating layer 123, the second insulating layer 122, the first insulating layer 121 and the buffer layer 105 may all be removed in the transmissive area TA and thus the surface of the substrate 100 may be exposed, as indicated by the solid lines. The opening OP may be defined by the sixth conductive layer 180, the bank 126, the fifth insulating layer 125, the fourth insulating layer 124, the third insulating layer 123, the second insulating layer 122, the first insulating layer 121, and the buffer layer 105. The substrate 100 may still not be removed even in the transmissive area TA. For example, the substrate 100 may overlap the transmissive area TA and may not include a through hole in the transmissive area TA. According to an embodiment of FIG. 6, many insulating layers may be additionally removed as described above, and thus the transmittance of the transmissive area TA may be further improved as compared with an embodiment of FIG. 5.

As an example, some of the bank 126, the fifth insulating layer 125, the fourth insulating layer 124, the third insulating layer 123, the second insulating layer 122, the first insulating layer 121 and the buffer layer 105 may be removed in the transmissive area TA, as shown by the dotted lines. For example, the layers disposed above the fourth insulating layer 124, for example, the via layer, may all be removed to form the opening OP.

FIG. 7 is a view showing an arrangement of pixels and transmissive areas at different display areas of a display panel according to an embodiment.

Referring to FIG. 7, according to an embodiment, each of the first display area DA1 and the second display area DA2 may include red pixels PX_R, green pixels PX_G, and blue pixels PX_B. In the illustrated embodiment, the pixels PX of different colors may have the same size, and the pixels PX of the first display area DA1 and the pixels PX of the second display area DA2 may have the same size. The second display area DA2 may include the transmissive areas TA in addition to the pixels PX. The size of the transmissive areas TA may be substantially equal to the size of the pixels PX. It is, however, to be understood that the disclosure is not limited thereto.

In the first display area DA1, the pixels PX of the same color may be arranged or disposed in the second direction DR2, and the pixels PX of different colors may be sequentially and repeatedly arranged or disposed in the first direction DR1. For example, in the first display area DA1, a red pixel PX_R, a green pixel PX_G, a blue pixel PX_B, a red pixel PX_R, a green pixel PX_G, a blue pixel and so on may be arranged or disposed in the first direction DR1.

In the second display area DA2, the pixels PX and transmissive areas TA may be alternately arranged or disposed in the first direction DR1. The pixels PX of different colors may be arranged or disposed in the first direction DR1. For example, in the second display area DA2, a red pixel PX_R, a transmissive area TA, a green pixel PX_G, a transmissive area TA, a blue pixel PX_B, a transmissive area TA and so on may be arranged or disposed in the first direction DR1. The pixels PX of the same color or the transmissive areas may be arranged or disposed in the second direction DR2. In the second display area DA2, the number of pixels PX may be substantially equal to the number of the transmissive areas TA. In the second display area DA2, the area of each of the pixels PX may be substantially equal to the area of each of the transmissive areas TA. For example, the area of the light transmission areas TA with respect to the entire area of the second display area DA2 may be about 50%.

As the pixels PX and the transmissive areas TA may be alternately arranged or disposed in the second display area DA2, for example, as each of the transmissive areas TA may be disposed between every two of the pixels PX, the transmissive areas TA may be less recognizable, compared to a large transmissive area without pixels. Therefore, even though there may be the transmissive areas TA, a user may not see the difference between the first display area DA1 and the second display area DA2 of the display panel due to the pixels PX arranged or disposed alternately with the transmissive areas TA, so that images may be displayed naturally. Besides, light may be transmitted through the transmissive areas TA as described above, so that the second display area DA2 may be used as a transparent display or a light sensing path.

According to an embodiment of FIG. 7, the number of pixels PX may be substantially equal to the number of the transmissive areas TA in the second display area DA2. When the sizes of the pixels PX and the transmissive areas TA of the first display area DA1 are substantially equal to those of the second display area DA2, the number of the pixels PX in the second display area DA2 may be substantially equal to half the number of pixels PX in the first display area DA1. For example, the number of the pixels PX per area in the second display area DA2 may be substantially equal to half the number of the pixels PX per area in the first display area DA1, and thus the resolution of the second display area DA2 may be about half the resolution of the first display area DA1. As a result, the display panel may be divided into a high-resolution area having a higher resolution and a low-resolution area having a lower resolution. When the high-resolution area and the low-resolution area are interspersed in the display panel 10, a user may recognize the difference in resolution between the areas, and thus the image quality may deteriorate. In this regard, by adjusting the arrangement of the areas and displaying different contents in different areas, it may be possible to make the difference in resolution less recognizable by the user.

Referring back to FIGS. 3 and 4, the polarizer POL may be disposed on the display panel 10. The polarizer POL may polarize the light passing therethrough. The polarizer polarity may reduce the reflection of external light.

The leveling layer 20 and the protection window 30 may be disposed on the polarizer POL in the first non-folding area NFA1. Although the protection window 30 may be disposed on the leveling layer 20 in the drawing, the disclosure is not limited thereto. The leveling layer 20 may be disposed on the protection window 30. The transmission control layer 40 may be disposed on the polarizer POL in the second non-folding area NFA2. The transmission control layer 40 may be disposed on the same layer (for example, the polarizer POL) as the leveling layer 20, but the disclosure is not limited thereto. When the leveling layer 20 is disposed on the protection window 30, the transmission control layer 40 may be disposed on the same layer as the protection window 30. In other words, the transmission control layer 40 may be disposed on an outer side of the leveling layer 20 and/or the protection window 30.

The leveling layer 20 may be made of a transparent material. The leveling layer 20 may be a film formed by applying a resin and curing it or may be transparent glass or plastic. It is to be understood that the material forming the leveling layer 20 is not limited thereto, and may be a coupling layer disposed between the polarizer POL and the protection window 30. In such case, the thickness of the coupling layer disposed between the polarizer POL and the protection window 30 may be greater than the thickness of the coupling layer disposed between the polarizer POL and the transmission control layer 40.

The leveling layer 20 may make up the difference between the thickness of the protection window 30 disposed in the first non-folding area NFA1 and the thickness of the transmission control layer 40 disposed in the second non-folding area NFA2. As an example, the thickness of the transmission control layer 40 may be greater than the thickness of the protection window 30, and accordingly the leveling layer 20 may be disposed on the protection window 30 so that the leveling layer 20 may make up the difference in thickness. For example, the sum of the thickness TH1 of the leveling layer 20 and the thickness TH2 of the protection window 30 may be substantially equal to the thickness TH3 of the transmission control layer 40. The upper surface of the transmission control layer 40 may be at the same height as the upper surface of the protection window 30 and may be on substantially the same plane as or on an extended surface from the upper surface of the protection window 30. A step that may occur between the active area AAR of the first non-folding area NFA1 and the active area AAR of the second non-folding area NFA2 of the display device 1 may be compensated for, accordingly. A user may recognize that the active area AAR of the display device 1 is generally flat. In other words, images displayed on the display device 1 recognized by the user may be smooth without unevenness.

The protection window 30 may be made of a transparent material. The protection window 30 may include, for example, glass or plastic. When the protection window 30 includes glass, the glass may be ultra thin glass (UTG) or thin glass. When the protection window 30 includes a plastic, the plastic may include, but is not limited to, a transparent polyimide.

The transmission control layer 40 may adjust the transmittance of light coming from the outside of the transmission control layer 40. The transmittance of the transmission control layer 40 may be, but is not limited to, a range of about 0% to about 96%. For example, the transmittance of the transmission control layer 40 may vary within the range of about 0% to about 96%. The transmission control layer 40 may have a thickness in a range of about of 0.3 µm to about 0.5 µm in the third direction DR3. It is, however, to be understood that the disclosure is not limited thereto. The transmission control layer 40 may have a thickness in a range of about of 0.1 µm to about 0.7 µm.

As the transmission control layer 40 is disposed above the display panel 10, for example, on the path of the light exiting from the display panel 10, it may be possible to control images so that they may not be displayed in a part or all of the active area AAR of the display device 1 by adjusting the transmittance of the transmission control layer 40 without turning on/off the display panel 10. For example, when a user wants the images displayed on the display device 1 not to be seen by others, the user may control the transmittance of the transmission control layer 40 so that the images on the display device 1 may not be visible or may not be clearly visible to others.

Hereinafter, the transmission control layer 40 will be described in detail with reference to FIGS. 8 to 11.

Figure 8:
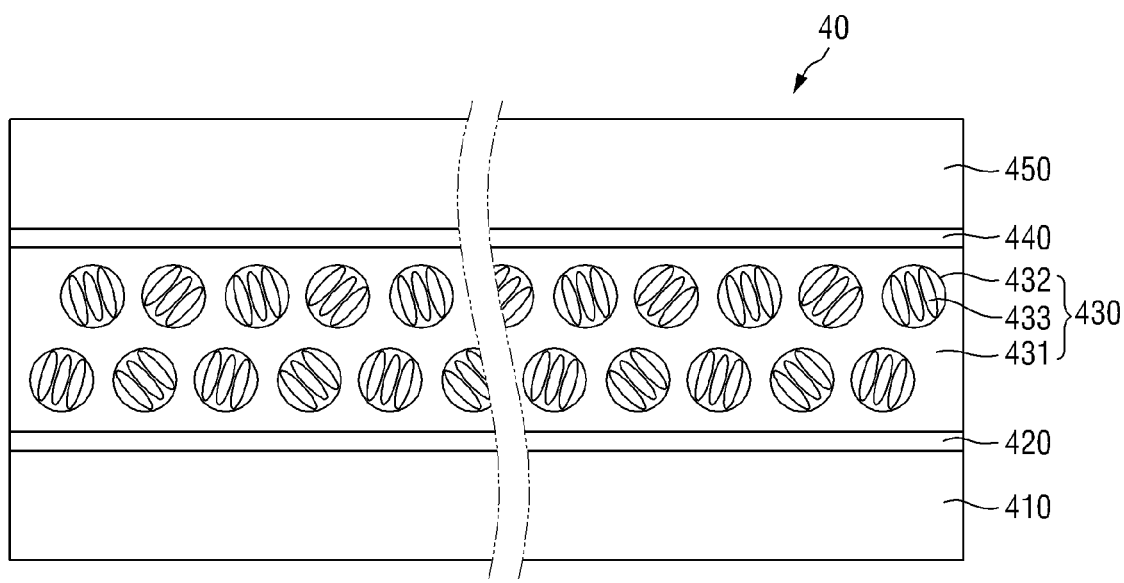
FIG. 8 is a schematic cross-sectional view of a transmission control layer according to an embodiment.
Figure 9:
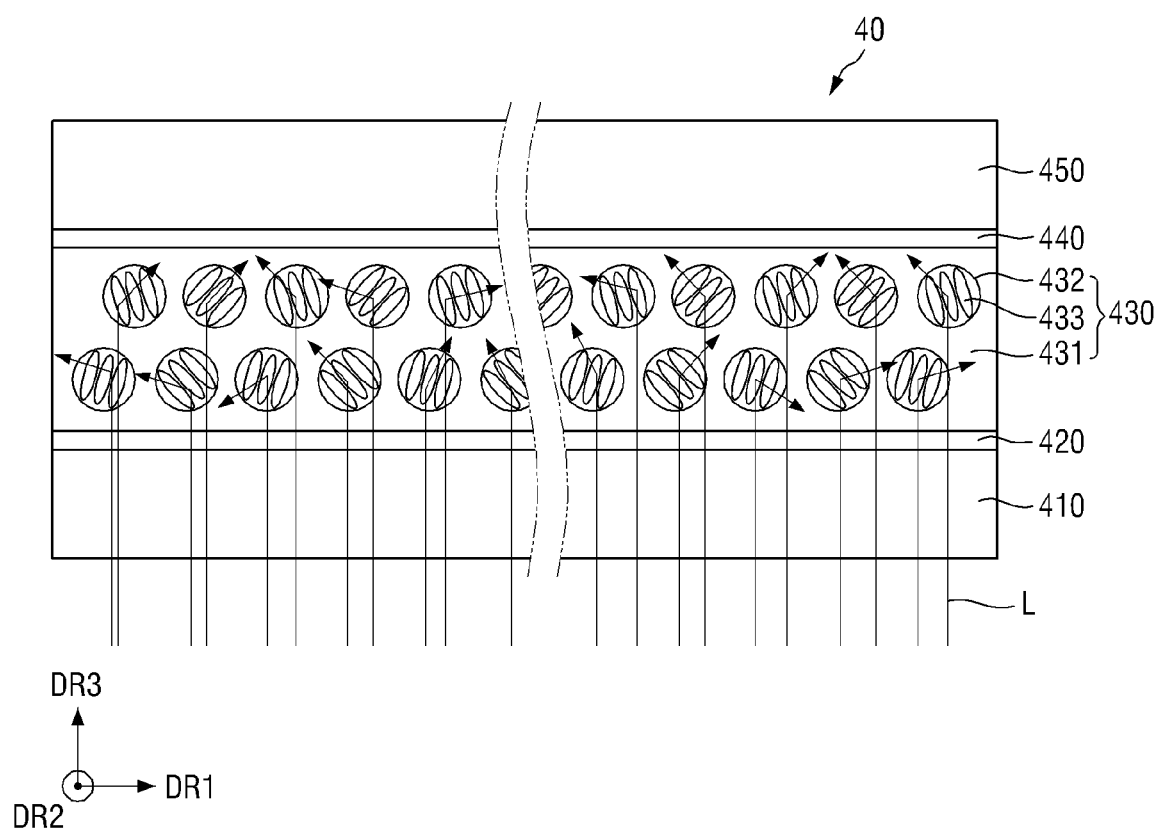
FIG. 9 is a schematic cross-sectional view showing an example of a light-blocking device in a light-blocking mode.
Figure 10:
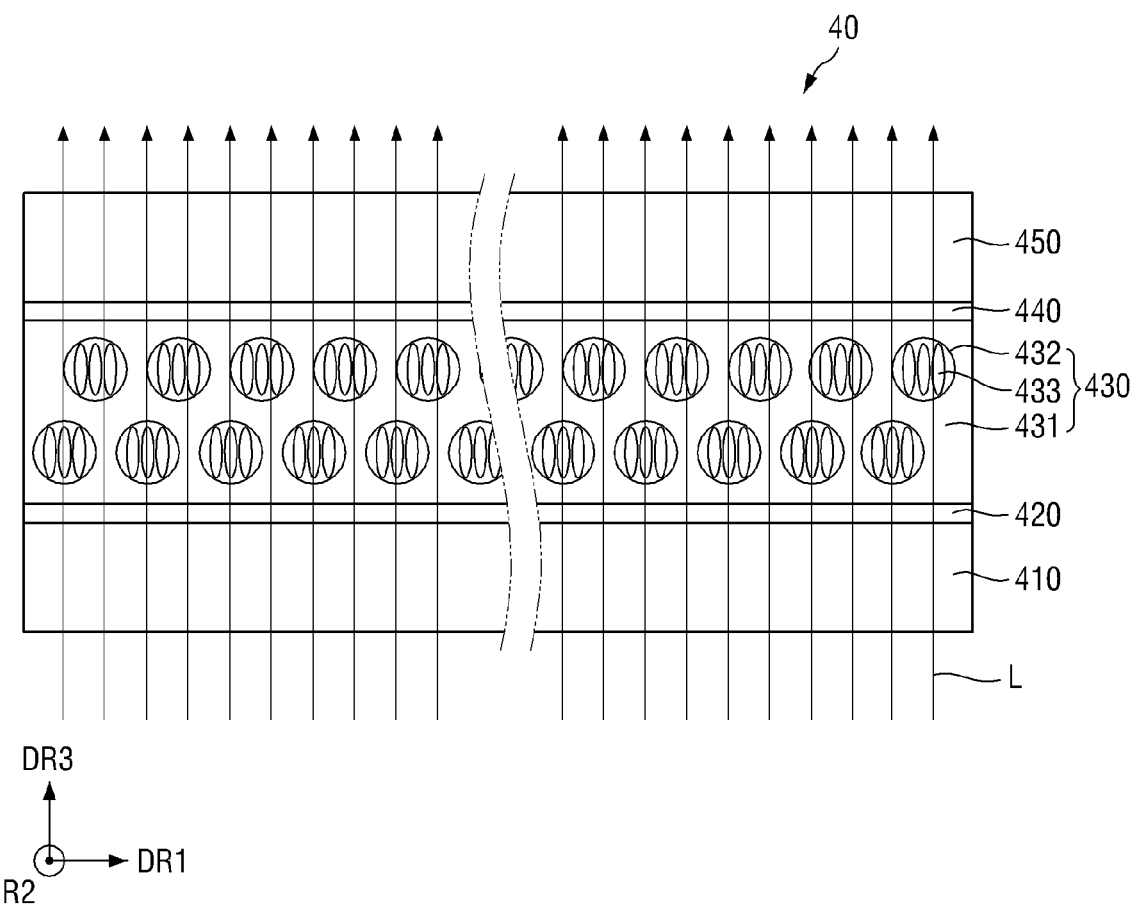
FIG. 10 is a schematic cross-sectional view showing an example of a light-blocking device in a light-transmitting mode.
Figure 11:
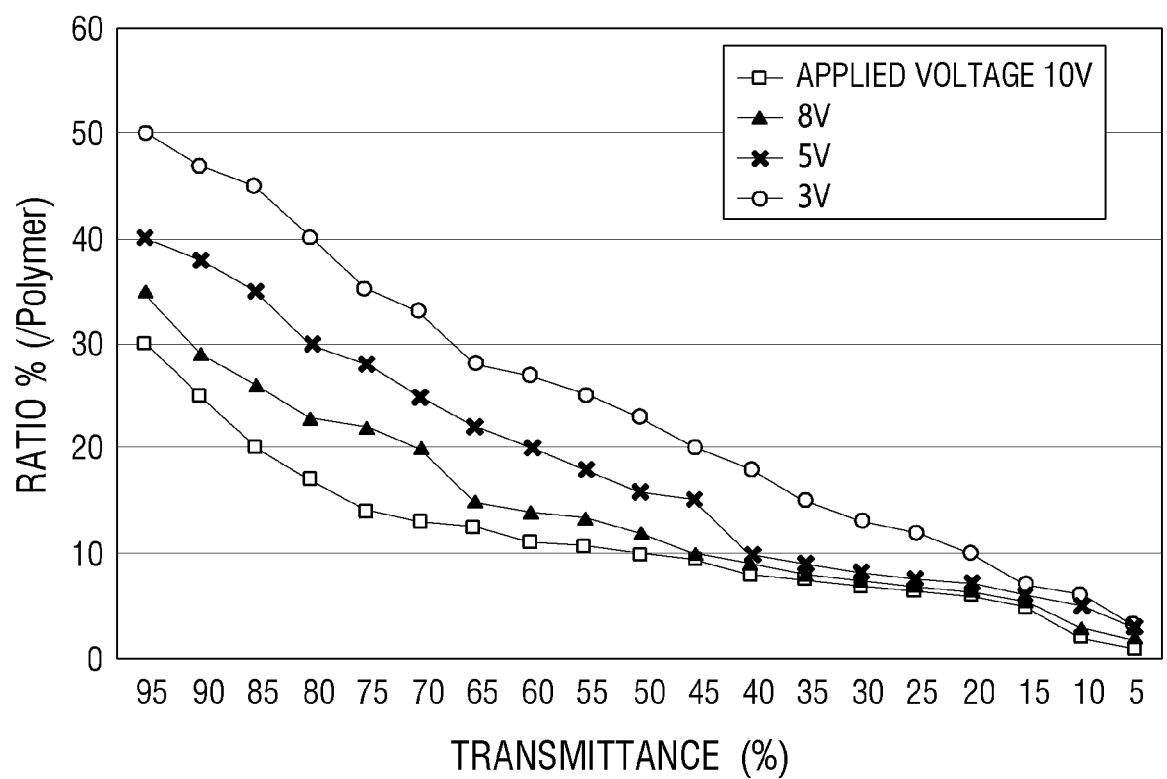
FIG. 11 is a graph showing the transmittance of the transmission control layer versus the ratio of liquid crystals at different voltages.

FIG. 8 is a schematic cross-sectional view of a transmission control layer according to an embodiment. FIG. 9 is a schematic cross-sectional view showing an example of a light-blocking device in a light-blocking mode. FIG. 10 is a schematic cross-sectional view showing an example of a light-blocking device in a light-transmitting mode. FIG. 11 is a graph showing the transmittance of the transmission control layer versus the ratio of liquid crystals at different voltages.

Referring to FIG. 8, the transmission control layer 40 may include a first liquid-crystal layer substrate 410, a first liquid-crystal layer electrode 420, a liquid-crystal layer 430, a second liquid-crystal layer electrode 440, and a second liquid-crystal layer substrate 450.

Each of the first liquid-crystal layer substrate 410 and the second liquid-crystal layer substrate 450 may be a transparent glass substrate or a plastic film. For example, the first liquid-crystal layer substrate 410 and the second liquid-crystal layer substrate 450 may be a sheet or a film including, but not limited to, cellulose resins such as triacetyl cellulose (TAC) and diacetyl cellulose (DAC), acrylic resins such as cyclic olefin polymer (COP), cyclic olefin copolymer (COC) and poly (methylmethacrylate) (PMMA), such as norbornene derivatives, polyolefins such as polycarbonate (PC), polyethylene (PE) and polypropylene (PP), polyesters such as polyvinyl alcohol (PVA), poly ether sulfone (PES), polyetheretherketone (PEEK), polyetherimide (PEI), polyethylenenaphthalate (PEN) and polyethyleneterephthalate (PET), polyimide (PI), polysulfone (PSF), or fluoride resins.

The first liquid crystal layer electrode 420 may be disposed on the first liquid-crystal layer substrate 410, and the second liquid crystal layer electrode 440 may be disposed on the second liquid-crystal layer substrate 450. The first and second liquid crystal layer electrodes 420 and 440 may be transparent electrodes. For example, the first and second liquid crystal layer electrodes 420 and 440 may be, but are not limited to, silver oxide (for example AgO or Ag$_2$O or Ag$_2$O$_3$), aluminum oxide (for example Al$_2$O$_3$), tungsten oxide (for example WO$_2$ or WO$_3$ or W$_2$O$_3$), magnesium oxide (for example MgO), molybdenum oxide (for example MoO$_3$), zinc oxide (for example ZnO), tin oxide (for example SnO$_2$), indium oxide (for example In$_2$O$_3$), chromium oxide (for example CrO$_3$ or Cr$_2$O$_3$), antimony oxide (for example Sb$_2$O$_3$ or Sb$_2$O$_5$), titanium oxide (for example TiO$_2$), nickel oxide (for example NiO), copper oxide (for example CuO or Cu$_2$O), vanadium oxide (for example V$_2$O$_3$ or V$_2$O$_5$), cobalt oxide (for example CoO), iron oxide (for example Fe$_2$O$_3$ or Fe$_3$O$_4$), niobium oxide (for example Nb$_2$O$_5$), indium tin oxide (for example indium tin oxide (ITO)), indium zinc oxide (for example indium zinc oxide (IZO)), aluminum doped zinc oxide (for example aluminum doped zinc oxide (ZAO)), aluminum doped tin oxide (for example, aluminum tin oxide (TAO) or antimony tin oxide (for example antimony tin oxide (ATO)).

The liquid-crystal layer 430 may be disposed between the first liquid-crystal layer substrate 410 and the second liquid-crystal layer substrate 450. The liquid-crystal layer 430 may be a polymer-dispersed liquid crystal (PDLC) layer. Although one liquid-crystal layer 430 may be disposed between the first liquid-crystal layer substrate 410 and the second liquid-crystal layer substrate 450 in the example shown in FIG. 8, the disclosure is not limited thereto. For example, more than one liquid-crystal layer may be disposed between the first liquid-crystal layer substrate 410 and the second liquid-crystal layer substrate 450. The refractive index anisotropy of the liquid-crystal layer 430 may be, but is not limited to, a range of about 0.10 to about 0.25 or a range of about 0.05 to about 0.30. The refractive index anisotropy of the liquid-crystal layer 430 may be, but is not limited to, a range of about 3 to about 30 or a range of about 10 to about 20.

The liquid-crystal layer 430 may include a polymer 431 and droplets 432. Each of the droplets 432 may include liquid crystals 433 (or liquid-crystal molecules). For example, the liquid crystals 433 may be dispersed as the droplets 432 by the polymer 431. The liquid crystals 433 may be nematic liquid crystals aligned by the application of vertical electric fields across the first and second liquid crystal layer electrodes 420 and 440, for example, the electric fields in the third direction DR3. It is, however, to be understood that the disclosure is not limited thereto.

Although not shown in the drawings, the droplets 432 may include dichroic dyes to implement the light-blocking mode which may represent black. The dichroic dyes may be dyes that may absorb light. For example, the dichroic dyes may be either black dyes that absorb all of the light in the visible wavelength range or dyes that absorb light outside the wavelength range of a particular color (for example red) and reflect light of the wavelength band of the particular color (for example red). Since the droplets 432 may include dichroic dyes, the liquid-crystal layer 430 may absorb light to block the light.

The liquid-crystal layer 430 may be operated between the light-blocking mode that may block light and the light-transmitting mode that may transmit light by controlling voltages applied to the first and second liquid crystal layer electrodes 420 and 440. For example, by controlling the voltages applied to the first and second liquid crystal layer electrodes 420 and 440, it may be possible to change the transmission control layer 40 between the light-blocking mode and the light-transmitting mode. Hereinafter, the light-blocking mode and the light-transmitting mode of the liquid-crystal layer 430 will be described in detail with reference to FIGS. 9 and 10.

Referring to FIG. 9, the liquid crystals 433 in the liquid-crystal layer 430 may be randomly aligned when no voltage is applied to the first and second liquid crystal layer electrodes 420 and 440 or when the difference between the first voltage applied to the first liquid-crystal layer electrode 420 and the second voltage applied to the second liquid-crystal layer electrode 440 is smaller than a threshold value. Then, light incident on the liquid-crystal layer 430 is scattered by the liquid crystals 433. Therefore, the liquid-crystal layer 430 may block light incident on the transmission control layer 40 from passing through it in the light-blocking mode.

Although not shown in the drawings, the liquid-crystal layer 430 may include a voltage supply for supplying a predetermined voltage to each of the first and second liquid crystal layer electrodes 420 and 440. The light-blocking mode and the light-transmitting mode may be implemented by aligning the liquid crystals 433 in the liquid-crystal layer 430 depending on the voltage applied to the first liquid crystal layer electrode 420 and the voltage applied to the second liquid crystal layer electrode 440.

Referring to FIG. 10, the liquid crystals 433 in the liquid-crystal layer 430 may be aligned in the third direction DR3 by application of a vertical electric field formed between the first liquid-crystal layer electrode 420 and the second liquid-crystal layer electrode 440, for example, the electric field in the third direction DR3 when the difference between the first voltage applied to the first liquid crystal layer electrode 420 and the second voltage applied to the second liquid crystal layer electrode 440 is greater than the threshold value. The liquid crystals 433 may be aligned in a direction in which light is incident, and the refractive index between the polymer 431 and the liquid crystals 433 of the liquid-crystal layer 430 may be reduced, so that scattering of the light incident on the liquid-crystal layer 430 may be reduced. Accordingly, most of the light incident on the liquid-crystal layer 430 may pass through the liquid-crystal layer 430.

FIG. 11 is a graph showing results according to Experimental Examples 1 to 4 below, and shows that the transmission control layer 40 may have different transmittances. For example, the transmission control layer 40 may transition between the light-transmitting mode and the light-blocking mode, and may have a transmittance of in a range of about 0% to about 96% or in a range of about 0% to about 99%. The transmittance of the transmission control layer 40 may be adjusted within the above ranges. For example, the transmittance of the transmission control layer 40 may be adjusted and may vary depending on the ratio of the liquid crystals 433 to the polymer 431 and the voltage applied to the transmission control layer 40.

Hereinafter, the transmittance of the transmission control layer 40 according to the ratio of the liquid crystals 433 to the polymer 431 when different voltages are applied to the transmission control layer 40 will be described.

Experimental Example 1

The voltage applied to the transmission control layer 40 was about 10V, and the transmittance of the transmission control layer 40 according to the ratio of the liquid crystals 433 to the polymer 431 was checked. The results of Experimental Example 1 are shown in Table 1 below:

TABLE 1

| Transmittance (%) | Ratio of Liquid Crystals to Polymer (%) |
| --- | --- |
| 95 | 30 |
| 90 | 25 |
| 85 | 20 |
| 80 | 17 |
| 75 | 18 |
| 70 | 13 |
| 65 | 12.5 |
| 60 | 11 |
| 55 | 10.8 |
| 50 | 10 |
| 45 | 9.5 |
| 40 | 8 |
| 35 | 7.5 |
| 30 | 7 |
| 25 | 6.5 |
| 20 | 6 |
| 15 | 5 |
| 10 | 2 |
| 5 | 1 |

Experimental Example 2

The voltage applied to the transmission control layer 40 was about 8V, and the transmittance of the transmission control layer 40 according to the ratio of the liquid crystals 433 to the polymer 431 was checked. The results of Experimental Example 1 are shown in Table 2 below:

TABLE 2

| Transmittance (%) | Ratio of Liquid Crystals to Polymer (%) |
|---|---|
| 95 | 35 |
| 90 | 29 |
| 85 | 26 |
| 80 | 23 |
| 75 | 22 |
| 70 | 20 |
| 65 | 15 |
| 60 | 14 |
| 55 | 13.5 |
| 50 | 12 |
| 45 | 10 |
| 40 | 9 |
| 35 | 8 |
| 30 | 7.5 |
| 25 | 7 |
| 20 | 6.5 |
| 15 | 5.5 |
| 10 | 3 |
| 5 | 2 |

Experimental Example 3

The voltage applied to the transmission control layer 40 was about 5V, and the transmittance of the transmission control layer 40 according to the ratio of the liquid crystals 433 to the polymer 431 was checked. The results of Experimental Example 1 are shown in Table 3 below:

TABLE 3

| Transmittance (%) | Ratio of Liquid Crystals to Polymer (%) |
|---|---|
| 95 | 40 |
| 90 | 38 |
| 85 | 35 |
| 80 | 30 |
| 75 | 28 |
| 70 | 25 |
| 65 | 22 |
| 60 | 20 |
| 55 | 18 |
| 50 | 16 |
| 45 | 15 |
| 40 | 10 |
| 35 | 9 |
| 30 | 8 |
| 25 | 7.5 |
| 20 | 7 |
| 15 | 6 |
| 10 | 5 |
| 5 | 3 |

Experimental Example 4

The voltage applied to the transmission control layer 40 was about 3V, and the transmittance of the transmission control layer 40 according to the ratio of the liquid crystals 433 to the polymer 431 was checked. The results of Experimental Example 1 are shown in Table 4 below:

TABLE 4

| Transmittance (%) | Ratio of Liquid Crystals to Polymer (%) |
|---|---|
| 95 | 50 |
| 90 | 47 |

TABLE 4-continued

| Transmittance (%) | Ratio of Liquid Crystals to Polymer (%) |
|---|---|
| 85 | 45 |
| 80 | 40 |
| 75 | 35 |
| 70 | 33 |
| 65 | 28 |
| 60 | 27 |
| 55 | 25 |
| 50 | 23 |
| 45 | 20 |
| 40 | 18 |
| 35 | 15 |
| 30 | 13 |
| 25 | 12 |
| 20 | 10 |
| 15 | 7 |
| 10 | 6 |
| 5 | 3 |

It can be seen from FIG. 11, Experimental Examples 1 to 4 and Tables 1 to 4 that the transmittance of the transmission control layer 40 may be adjusted within the range of about 5% to about 95% depending on the ratio of the liquid crystals 433 to the polymer 431.

Referring back to FIGS. 3 and 4, the protective film 50 may be disposed on the protection window 30 and the transmission control layer 40. The protective film 50 may perform at least one of the following functions of anti-scattering when the protection window 30 or the transmission control layer 40 may be broken, during shock absorption, anti-scratch, anti-fingerprint, and anti-glare. The protective film 50 may be eliminated.

The polymer film layer PF may be disposed under or below the display panel 10. The polymer film layer PF may include, for example, polyimide (PI), polyethylene terephthalate (PET), polycarbonate (PC), polyethylene (PE), polypropylene (PP), polysulfone (PSF), polymethyl methacrylate (PMMA), triacetyl cellulose (TAC), cycloolefin polymer (COP), within the spirit and the scope of the disclosure.

The cushion layer CU may be disposed under or below the polymer film layer PF. The cushion layer CU may increase durability against impacts that may be exerted in the thickness direction (third direction DR3) of the display device 1, and may mitigate impact on the display device 1 in a case that the display device may be dropped. The cushion layer CU may include polyurethane or the like within the spirit and the scope of the disclosure.

Although not shown in the drawings, a metal plate may be disposed under or below the cushion layer CU or the polymer film layer PF. The metal plate may include, for example, a metal having excellent thermal conductivity such as copper and silver.

In order to facilitate folding of the display device 1, some layers of the display device 1 may be separated at the folding line FDA. For example, the protection window 30 and the transmission control layer 40 disposed on the display panel may be separated from each other at the folding line FDA. In such case, the protection window 30 may be spaced apart from the transmission control layer 40 in a case that the display device 1 is unfolded. In a case that the display device 1 is unfolded, the protection window 30 and the transmission control layer 40 may not overlap the folding line FDA, but the disclosure is not limited thereto.

The display-only area 11 and the display-transmission area 12 may also be separated from each other at the folding line FDA. However, if they have enough flexibility, they may be connected with each other irrespective of the folding line FDA and the non-folding area NFA.

In a case that the display device 1 is in-folded along the folding line FDA as shown in FIG. 4, the second non-folding area NFA2 may overlap the first non-folding area NFA1 in the thickness direction. The polymer film layer PF, the cushion layer CU, the polarizer POL and the protective film 50 connected irrespective of the folding line FDA may have a substantially curved shape along the width direction of the folding line FDA in the schematic cross-sectional view.

As the display device 1 is folded inward along the folding line FDA, portions of the display-only area 11 and the display-transmission area 12 adjacent to the folding line FDA may be curved along the width direction near the folding line FDA in the schematic cross-sectional view. Portions of the protective window 30 and the transmission control layer 40 adjacent to the folding line FDA may be curved along the width direction near the folding line FDA in the schematic cross-sectional view. It is, however, to be understood that the disclosure is not limited thereto. At least a portion of the display-only area 11, the display-transmission area 12, the protection window 30, and the transmission control layer 40 may not be bent even in a case that the display device 1 may be folded inward along the folding line FDA. Even in such case, the display device 1 may be smoothly folded because the display-only area 11 may be spaced apart from the display-transmission area 12, and the protection window 30 may be spaced apart from the transmission control layer 40.

Hereinafter, an operation of the display device 1 according to an embodiment in a case that the display device may be unfolded will be described with reference to FIG. 12.

Figure 12:
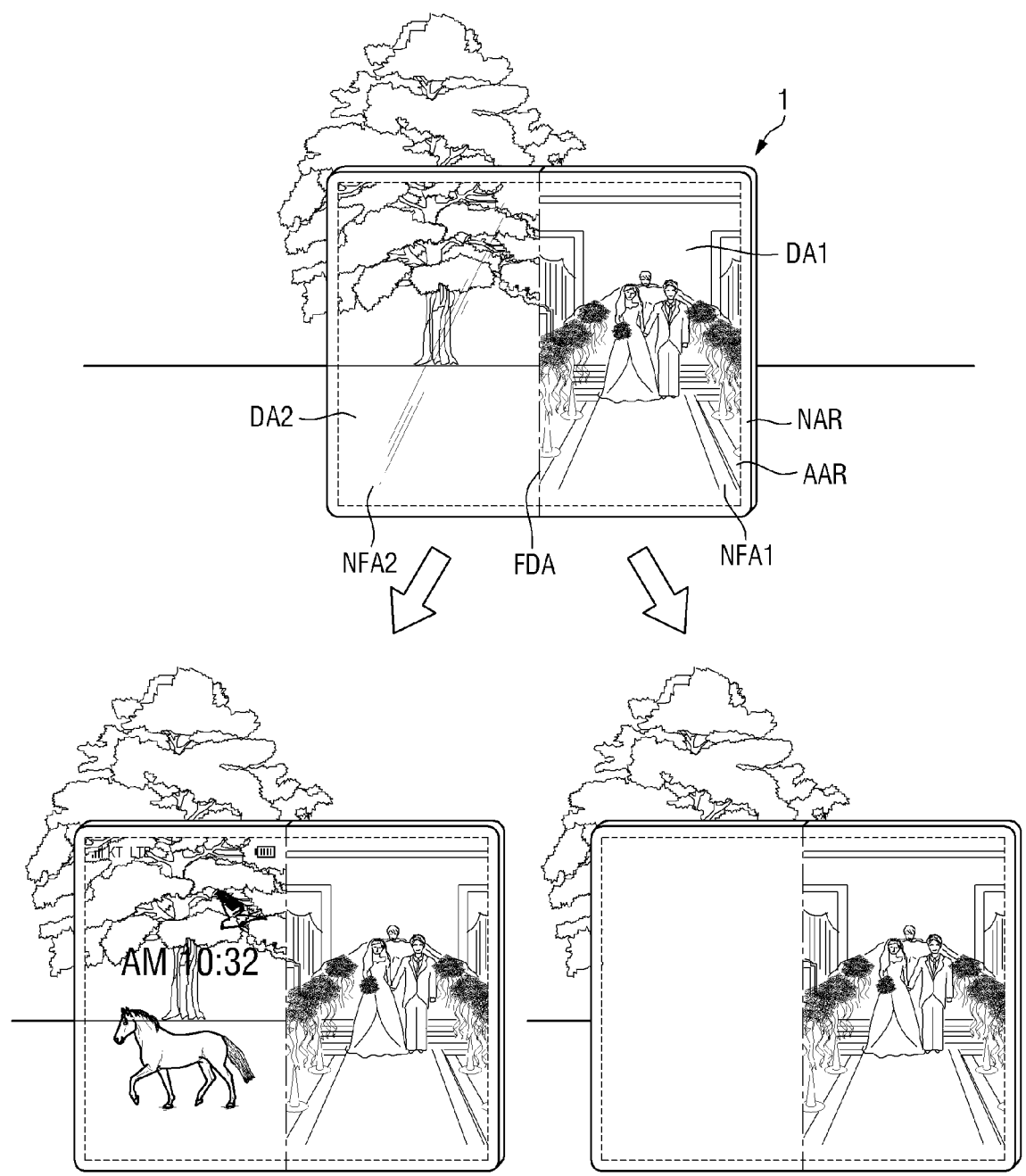
FIG. 12 is a perspective view showing an operation of the display device according to an embodiment in a case that the display device is unfolded.

FIG. 12 is a perspective view showing an operation of the display device according to an embodiment in a case that the display device is unfolded.

Referring to FIG. 12, the transmittance of the second display area DA2 of the display device 1 may vary. As an example, by adjusting the transmittance of the transmission control layer 40, the transmittance of the second display area DA2 may be adjusted. In this manner, the user convenience may be improved.

As an example, since the second display area DA2 may include the display-transmission area 12 including the transmissive areas TA and the transmission control layer 40, when the transmission control layer 40 transitions to the light-transmitting mode, light may transmit not only through the display-transmission area 12 but also the transmission control layer 40. Accordingly, an object behind the display device 1, for example, behind the second non-folding area NFA2 of the display device 1 may be seen through the second non-display area DA2. In this state, the second display area DA2 may display images. For example, the user may see an object behind the display device 1 through the second display area DA2 and also may see images displayed on the second display area DA2. Accordingly, the user may see an object behind the display device 1 through the second display area DA2 or may see images displayed on the second display area DA2 while seeing the object as desired. By varying the transmittance of the transmission control layer 40, it may be possible to adjust the sharpness of the object behind the display device 1 that may be seen through the second display area DA2.

Although different images may be displayed on the first display area DA1 and the second display area DA2 in the drawings, the disclosure is not limited thereto. For example, in a case that both the first display area DA1 and the second display area DA2 display images, a single image may be displayed from the first display area DA1 to the second display area DA2. In other words, a single image may be displayed on the entire area of the first display area DA1 and the second display area DA2, for example, the active area AAR.

When the transmission control layer 40 transitions to the light-blocking mode, the user may no longer see the object behind the display device 1. For example, if the user does not want to see an object behind the display device 1 through the second display area DA2, the transmission control layer 40 transitions to the light-blocking mode, so that the object behind the display device 1 may no longer be visible to the user.

Hereinafter, an operation of the display device 1 according to an embodiment in a case that the display device is folded will be described with reference to FIG. 13.

Figure 13:
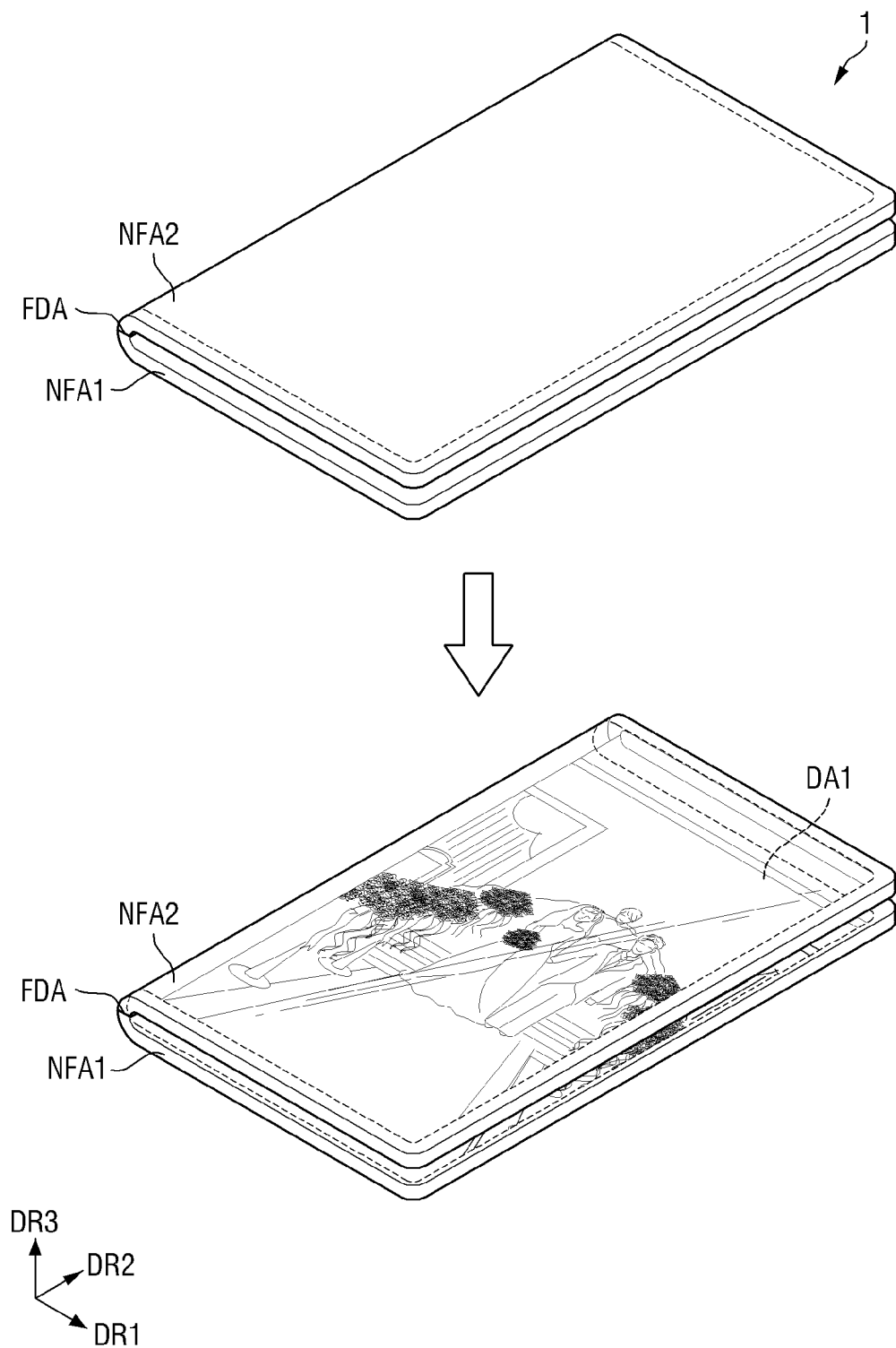
FIG. 13 is a perspective view showing an operation of the display device according to an embodiment in a case that the display device is folded.

FIG. 13 is a perspective view showing an operation of the display device according to an embodiment in a case that the display device is folded.

Referring to FIG. 13, the transmittance of the second display area DA2 of the display device 1 may vary. For example, by adjusting the transmittance of the transmission control layer 40, the transmittance of the second display area DA2 may be adjusted. In this manner, the user convenience may be improved.

As an example, when the transmission control layer 40 is in the light-blocking mode while the display device 1 may be folded, the user may not see images displayed on the first display area DA1. However, when the transmission control layer 40 transitions to the light-transmitting mode, the light may transmit through the display-transmission area 12 as well as the transmission control layer 40, so that images displayed on the first display area DA1 may be seen from the outside through the rear surface of the second non-folding area NFA2. For example, the user may see the images displayed on the first display area DA1 through the rear surface of the second non-folding area NFA2. Therefore, the user may change the transmission control layer 40 to the light-transmitting mode to see images displayed on the first display area DA1 through the rear surface of the second non-folding area NFA2, or may change the transmission control layer 40 to the light-blocking mode so that the images displayed on the first display area DA1 may not be seen from the outside, as desired.

Hereinafter, a change in the transmittance of the transmission control layer 40 according to the angle at which the display device 1 according to an embodiment may be folded will be described. However, the disclosure is not limited thereto.

Figure 14:
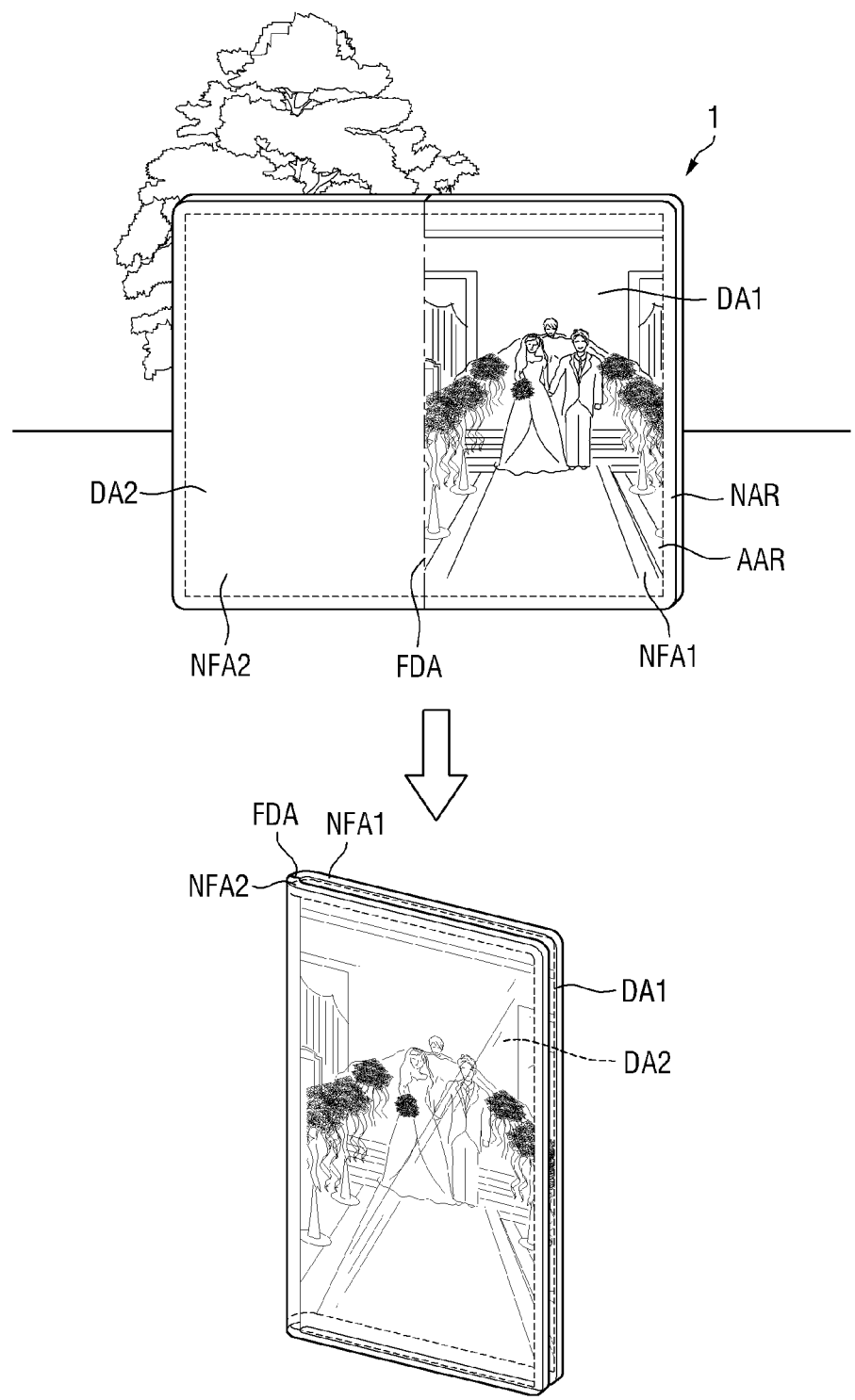
FIG. 14 is a perspective view illustrating a change in the transmittance of the second display area according to the angle formed between the first non-folding area and the second non-folding area of a display device according to an embodiment.

FIG. 14 is a perspective view illustrating a change in the transmittance of the second display area according to the angle formed between the first non-folding area and the second non-folding area of a display device according to an embodiment.

Referring to FIG. 14, the transmittance of the second display area DA2 of the display device 1 may vary depending on the angle between the first non-folding area NFA1 and the second non-folding area NFA2. For example, the transmittance of the transmission control layer 40 may be adjusted depending on the angle at which the display device 1 is folded. In this manner, the user convenience may be improved.

as an example, the angle between the first non-folding area NFA1 and the second non-folding area NFA2 may vary while the display device 1 may be folded. As a result, the transmittance of the transmission control layer 40 may vary. As a non-limiting example, when the transmission control layer 40 is in the light-blocking mode while the display device is unfolded, if the display device 1 is folded, the transmission control layer 40 may transition to the light-transmitting mode as soon as the angle between the first non-folding area NFA1 and the second non-folding area NFA2 becomes smaller than a predetermined angle. Alternatively, the transmittance of the transmission control layer 40 may vary gradually depending on the angle between the first non-folding area NFA1 and the second non-folding area NFA2. Therefore, the user may adjust the transmittance of the transmission control layer 40 by simply folding the display device 1 without any additional operation as desired. As an example, even if the display device 1 is folded while the transmission control layer 40 is in the light-blocking mode, the images displayed on the first display area DA1 in a case that the display device 1 may be unfolded may be seen through the second display area DA2.

The display device 1 may include an angle detector (not shown) that may detect a change in the angle between the first non-folding area NFA1 and the second non-folding area NFA2. The angle detector may include, but is not limited to, a proximity light sensor (not shown) and a hall sensor (not shown).

Hereinafter, display devices according to other embodiments will be described. In the following description, the same or similar elements will be denoted by the same or similar reference numerals, and redundant descriptions will be omitted or briefly described. Descriptions will be made focusing on differences from the above embodiment.

Figure 15:
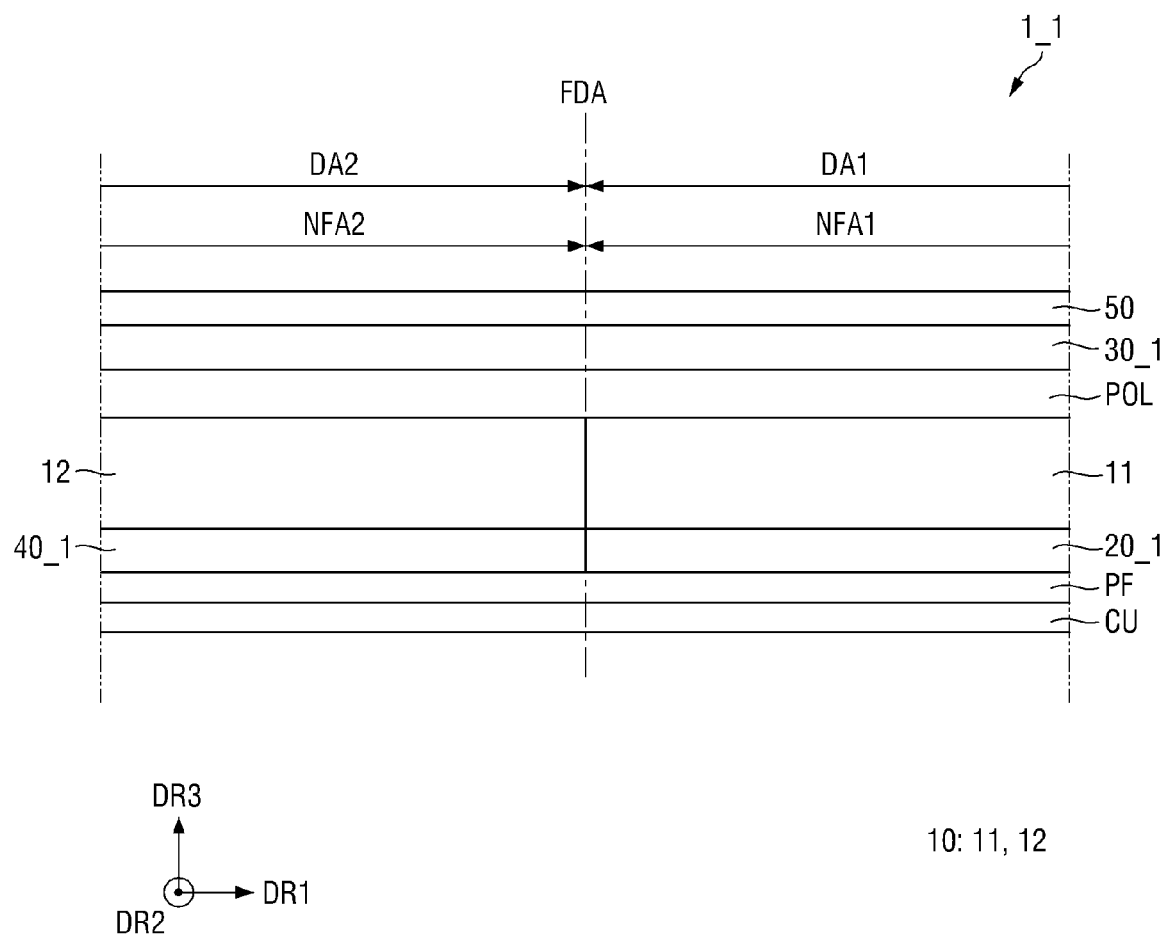
FIG. 15 is a schematic cross-sectional view of a display device according to an embodiment.
Figure 16:
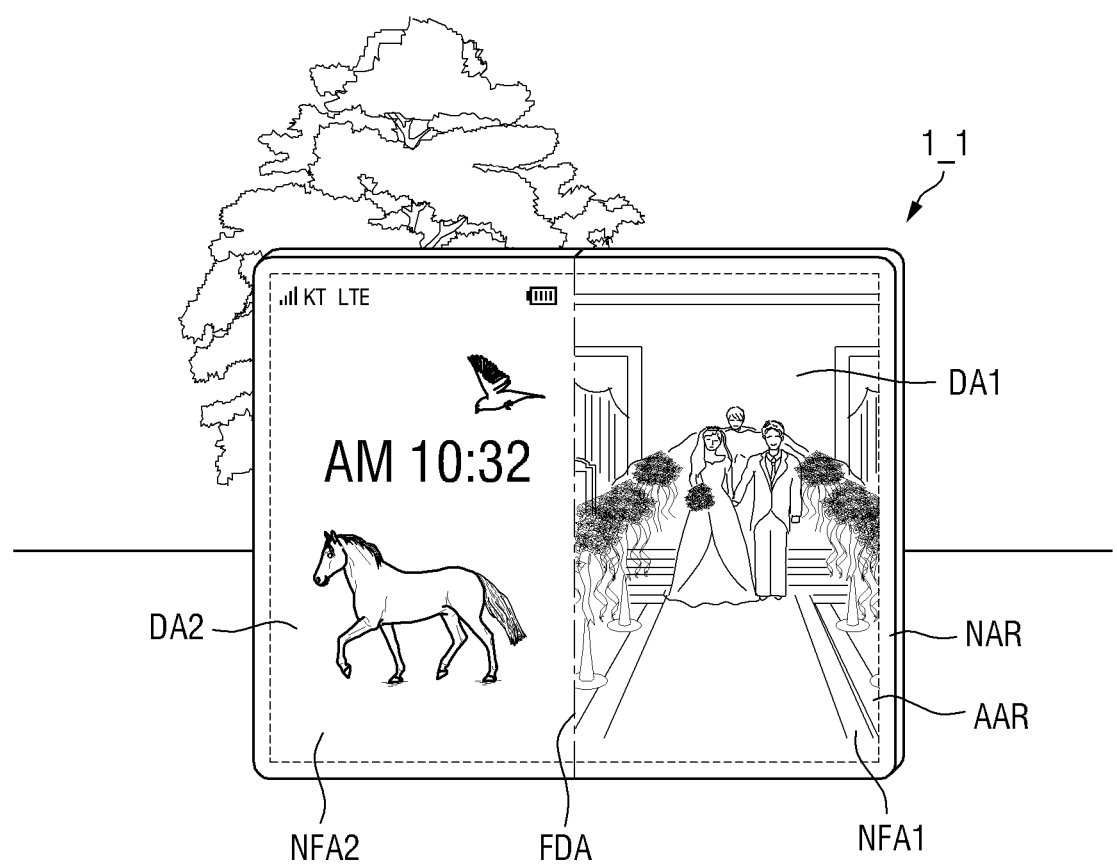
FIG. 16 is a perspective view showing an operation of the display device according to an embodiment in a case that the display device is unfolded.

FIG. 15 is a schematic cross-sectional view of a display device according to an embodiment. FIG. 16 is a perspective view showing an operation of the display device according to an embodiment in a case that the display device is unfolded.

A display device 1_1 according to an embodiment of FIGS. 15 and 16 may be different from the display device 1 according to an embodiment of FIG. 3 in that the display device 1_1 may include a transmission control layer 40_1 disposed under or below a display panel 10.

According to an embodiment, the transmission control layer 40_1 may not be disposed on the display panel 10, for example, between the display panel 10 and the protective film 50 but may be disposed under or below the display panel 10, for example, between the display panel 10 and the polymer film layer PF in the drawing. In other words, the transmission control layer 40_1 may be disposed in the second non-folding area NFA2 and under or below the display-transmission area 12.

A leveling layer 20_1 may be disposed on a side of the transmission control layer 40_1. For example, the leveling layer 20_1 may be disposed in the first non-folding area NFA1 and under or below the display-only area 11. In such case, the thickness of the transmission control layer 40_1 may be substantially equal to the thickness of the leveling layer 20_1, and they may be spaced apart from each other near the folding line FDA.

The display device 1_1 may have further operation aspects in a case that it is unfolded, in addition to the above-described operation aspects of the display device 1. As a non-limiting example, in a case that the display device 1_1 is unfolded, a user may not see an object behind the display device 1_1 through the second display area DA2 while images may be displayed on the second display area DA2. For example, while the transmission control layer 40_1 is in the light-blocking mode, images may be displayed on the second display area DA2.

Even in this case, the user may adjust the transmittance of the second display area DA2 as desired, and accordingly user convenience may be improved.

Figure 17:
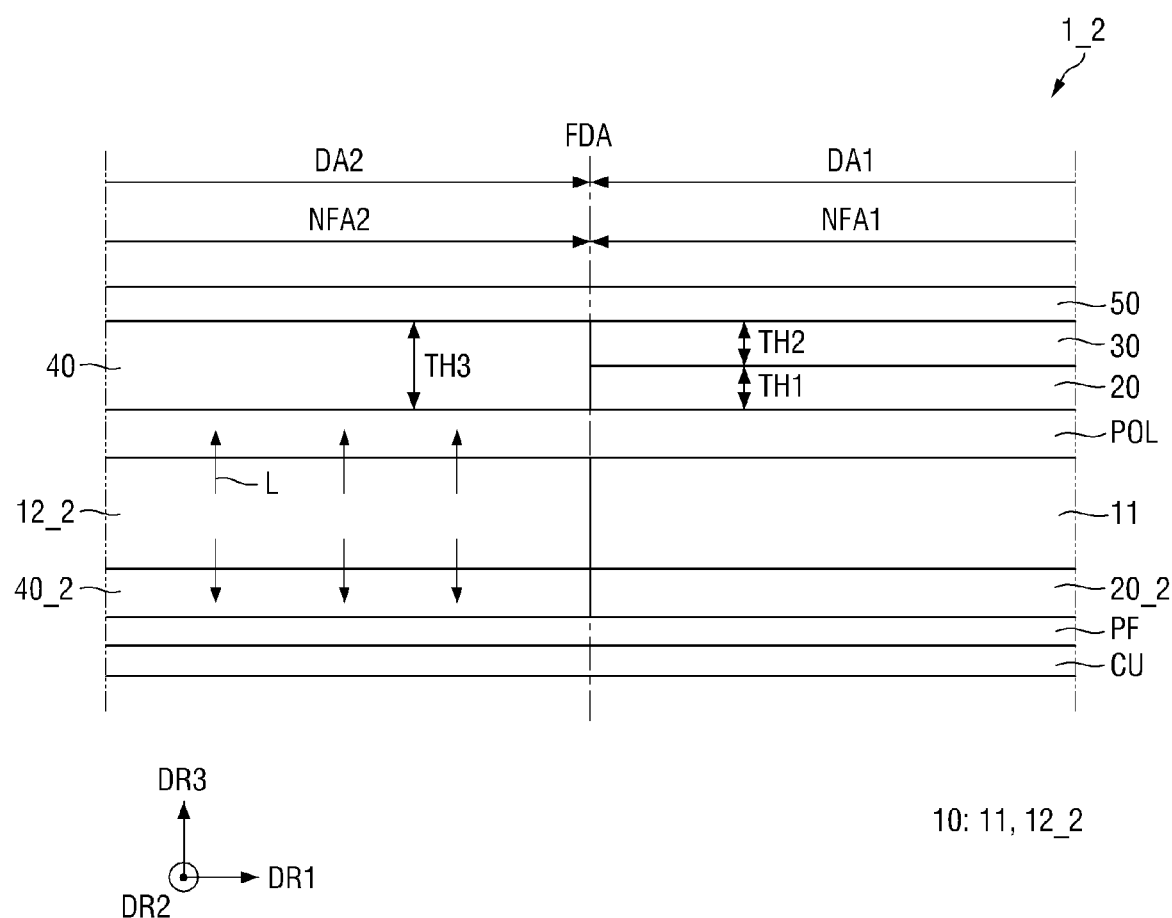
FIG. 17 is a schematic cross-sectional view of a display device according to an embodiment.
Figure 18:
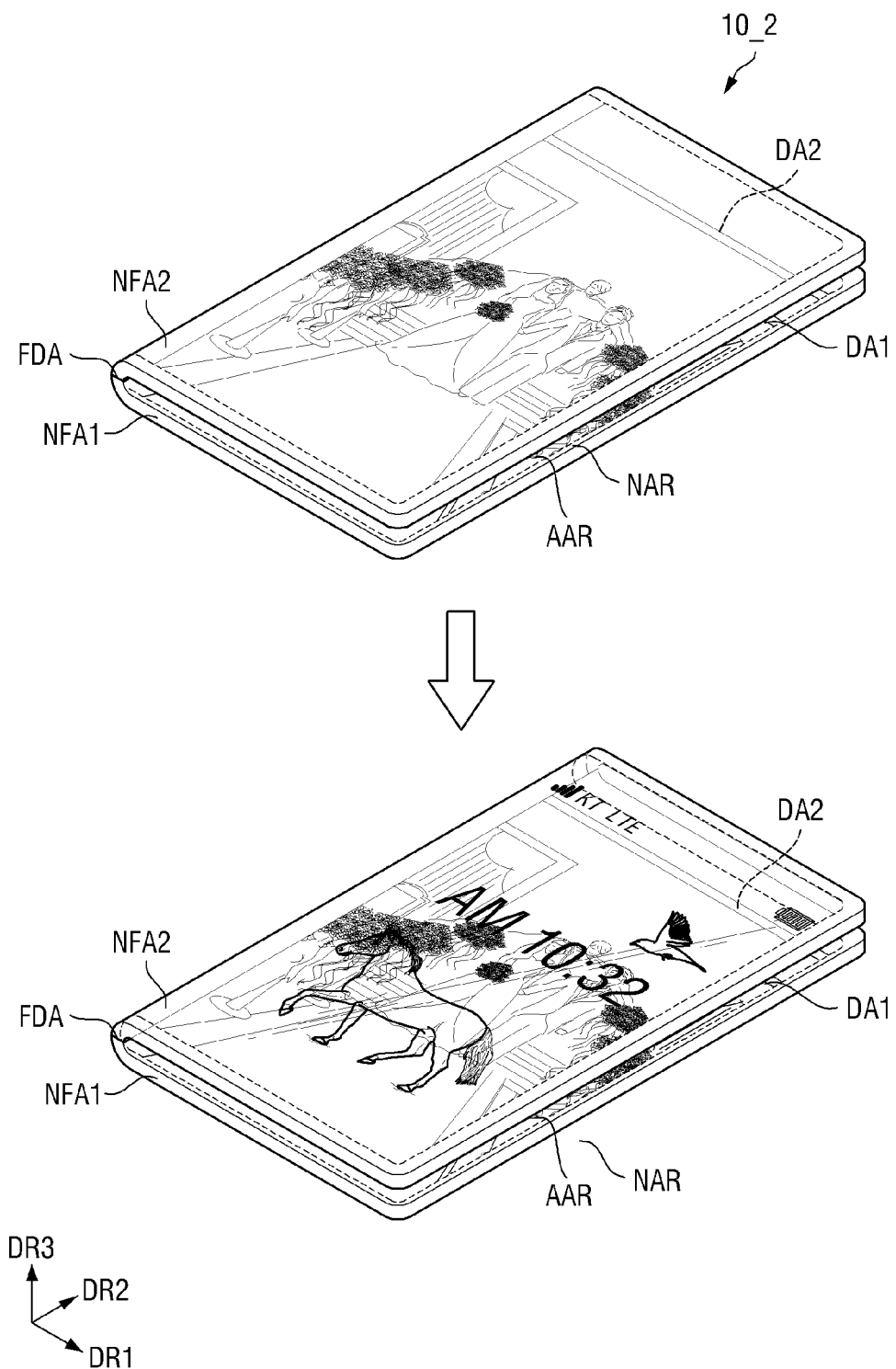
FIG. 18 is a perspective view showing an operation of the display device according to an embodiment in a case that the display device is folded.

FIG. 17 is a schematic cross-sectional view of a display device according to an embodiment. FIG. 18 is a perspective view showing an operation of the display device according to an embodiment in a case that the display device is folded. A display device 1_2 according to an embodiment of FIGS. 17 and 18 may be different from the display device 1 according to an embodiment of FIG. 3 in that the display device 1_2 may include a lower transmission control layer 40_2 and that a display-transmission area 12_2 may be a both-sided emission display panel.

As an example, the display device 1_2 according to an embodiment may include a transmission control layer 40 and may include the lower transmission control layer 40_2 disposed under or below the display-transmission area 12_2 in the second non-folding area NFA2. A lower leveling layer 20_2 may be disposed on an outer side of the lower transmission control layer 40_2. For example, under or below the display panel 10, the lower leveling layer 20_2 may be disposed in the first non-folding area NFA1, and the lower transmission control layer 40_2 may be disposed in the second non-folding area NFA2. The lower transmission control layer 40_2 may be spaced apart from the lower leveling layer 20_2 near the folding line FDA. The thickness of the lower transmission control layer 40_2 may be substantially equal to the thickness of the lower leveling layer 20_2.

In addition, according to an embodiment, the display-transmission area 12_2 may be a both-sided emission display panel. In such case, the anode electrode 170 and the cathode electrode 180 of the display-transmission area 12_2 may be made of a material that may transmit light. Light 1' may exit from the display-transmission area 12_2 toward the upper side and the lower side. For example, light 1' exiting from the display-transmission area 12_2 may travel toward the transmission control layer 40 and the lower transmission control layer 40_2.

The display device 1_2 may have further operation aspects in a case that the display device is folded inward, in addition to the above-described operation aspects of the display devices. As a non-limiting example, when the transmission control layer 40 is in the light-blocking mode and the lower transmission control layer 40_2 is in the light-transmitting mode, images displayed on the first display area DA1 may not be seen through the second non-folding area NFA2, while the second non-folding area NFA2 may display images displayed on the second display area DA2 through the rear surface of the display device 10_2. In this state, the transmission control layer 40 may transition to the light-transmitting mode, and the second non-folding area NFA2 may display images displayed on the second display area DA2 as well as the images displayed in the first display area DA1 through the rear surface of the display device 10_2. For example, the user may see the image displayed on the first display area DA1 and the image displayed on the second display area DA2 together. Accordingly, the user may see more various types of images.

For example, the user may adjust the transmittance of the second display area DA2 as desired, and accordingly user convenience may be further improved.

Figure 19:
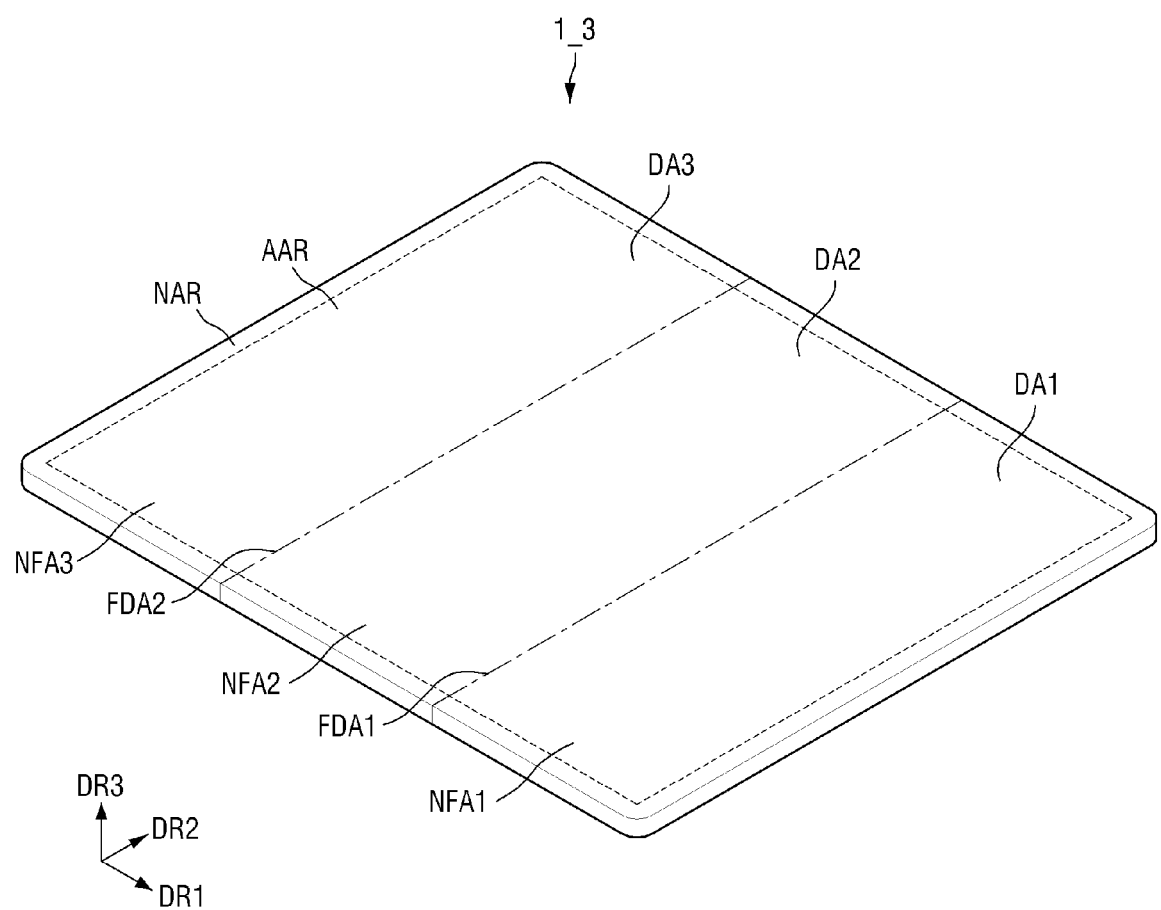
FIG. 19 is a perspective view of a display device according to an embodiment.

FIG. 19 is a perspective view of a display device according to an embodiment.

Figure 20:
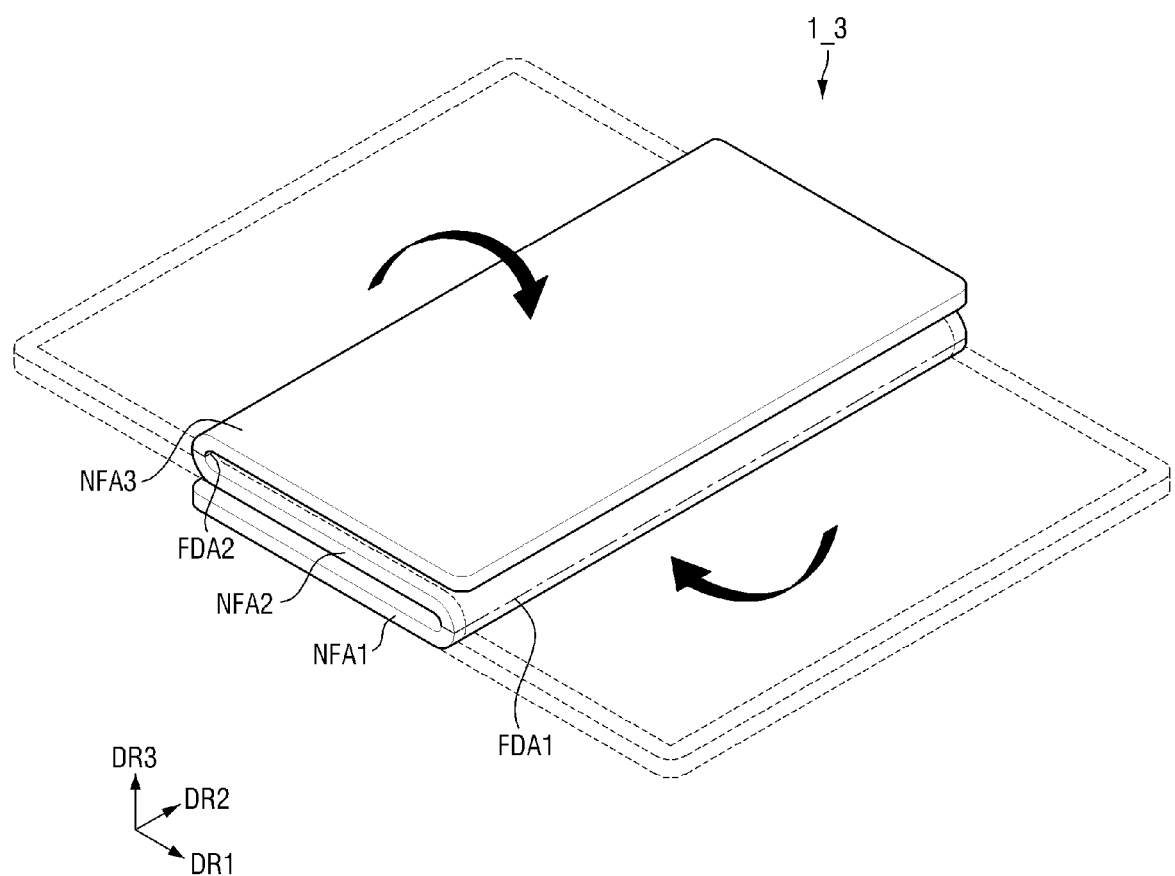
FIG. 20 is a perspective view showing the display device of FIG. 1 in a case that the display device is multi-folded.

FIG. 20 is a perspective view showing the display device of FIG. 1 in a case that the display device is multi-folded.

A display device according to an embodiment of FIGS. 19 and 20 may be different from the display device of FIG. 1 in that the former may include folding lines.

A display device 1_3 according to an embodiment may include a first folding line FDA1 and a second folding line FDA2, may include a first non-folding area NFA1, a second non-folding area NFA2 and a third non-folding area NFA3, and may include a first display area DA1, a second display area DA2, and a third display area DA3. The first non-folding area NFA1 (or the first display area DA1) and the second non-folding area NFA2 (or the second display area DA2) may be divided by the first folding line FDA1. The second non-folding area NFA2 (or the second display area DA2) and the third non-folding area NFA3 (or the third display area DA3) may be divided by the second folding line FDA2.

The display device 1_3 may be folded over the first folding line FDA1 and the second folding line FDA2. Although the display device 1_3 may be folded outward over the first folding line FDA1 and may be folded inward over the second folding line FDA2 in the example shown in FIGS. 19 and 20, the disclosure is not limited thereto.

The transmission control layer 40 and the display-transmission area 12 of the display panel 10 may be disposed in the third display area DA3 of the display device 1_3. In such case, the user may adjust the transmittance of the third display area DA3 while the display device 1_3 is folded, and accordingly, the user may see images displayed on the second display area DA2.

Even in this case, the user may adjust the transmittance of the third display area DA3 as desired, and accordingly the user convenience may be improved.

While the embodiments have been described with reference to the accompanying drawings, it will be understood by those skilled in the art that various modifications may be made without departing from the scope of the disclosure and without changing essential features. Therefore, the above-described embodiments should be considered in a descriptive sense only and not for purposes of limitation.

What is claimed is:

1. A display device comprising:
    a first non-folding area and a second non-folding area;
    a display panel disposed in the first non-folding area and the second non-folding area, wherein the display panel in the first non-folding area comprises a display-only area, and the display panel in the second non-folding area comprises a display-transmission area;
    a leveling layer disposed on the display panel in the first non-folding area;
    a protection window disposed on the leveling layer in the first non-folding area;
    a transmission control layer disposed on the display panel in the second non-folding area;
    a lower leveling layer disposed below the display-only area; and
    a lower transmission control layer disposed below the display-transmission area,
    wherein a thickness of the transmission control layer is substantially equal to a sum of a thickness of the leveling layer and a thickness of the protection window.

2. The display device of claim 1, wherein the transmission control layer comprises a polymer-dispersed liquid crystal layer.

3. The display device of claim 2, wherein a refractive index anisotropy of the polymer-dispersed liquid crystal layer is in a range of about 0.1 to about 0.25.

4. The display device of claim 1, wherein the transmittance control layer has a transmittance in a range of about 5% to about 95%.

5. The display device of claim 1, further comprising:
    a protective film disposed on the transmission control layer and the protection window and extending from the first non-folding area to the second non-folding area.

6. The display device of claim 1, wherein the display-transmission area comprises a plurality of pixels and at least one transmissive area.

7. The display device of claim 6, wherein the display-only area comprises a plurality of pixels and no transmissive area.

8. The display device of claim 6, wherein the display-transmission area is a both-sided emission display panel.

9. The display device of claim 8, wherein a thickness of the lower transmission control layer is substantially equal to a thickness of the lower leveling layer.

10. The display device of claim 1, wherein the thickness of the transmission control layer is in a range of about 0.3 to about 0.5 µm or in a range of about 0.1 to about 0.7 µm.

11. The display device of claim 10, wherein
    the transmission control layer comprises liquid crystal molecules, and
    a refractive index anisotropy of the liquid crystal molecules is in a range of about 0.10 to about 0.25.

12. A display device comprising:
    a first non-folding area, a second non-folding area, and a folding line disposed between the first non-folding area and the second non-folding area;
    a display panel comprising:
    a display-only area disposed only in the first non-folding area;
    a display-transmission area disposed only in the second non-folding area; and
    a transmission control layer disposed in the second non-folding area;
    a lower leveling layer disposed below the display-only area; and
    a lower transmission control layer disposed below the display-transmission area, wherein
    the display panel comprises pixels and transmissive areas,
    the transmissive areas have a transmittance higher than a transmittance of the pixels, and
    the transmissive areas are disposed in the display-transmission area.

13. The display device of claim 12, further comprising:
    an active area comprising:
    a first display area overlapping the first non-folding area; and
    a second display area overlapping the second non-folding area,
    wherein a resolution of the first display area is greater than a resolution of the second display area.

14. The display device of claim 12, wherein
    the pixels and the transmissive areas are arranged alternately in the display-transmission area, and
    an area of the pixels is substantially equal to an area of the transmissive areas.

15. The display device of claim 12, further comprising:
    a protection window and a leveling layer disposed in the first non-folding area,
    wherein a sum of a thickness of the protection window and a thickness of the leveling layer is substantially equal to a thickness of the transmission control layer.

16. The display device of claim 12, wherein a thickness of the transmission control layer is in a range of about 0.3 to about 0.5 μm or in a range of about 0.1 to about 0.7 μm.

17. The display device of claim 16, wherein the transmission control layer comprises liquid crystal molecules, and
    a refractive index anisotropy of the liquid crystal molecules is in a range of about 0.10 to about 0.25.

18. The display device of claim 12, wherein the display-transmission area is a both-sided emission display panel.

19. The display device of claim 18, wherein a thickness of the lower transmission control layer is substantially equal to a thickness of the lower leveling layer.

\* \* \* \* \*